United States Patent
Moon

(10) Patent No.: US 10,153,896 B2
(45) Date of Patent: Dec. 11, 2018

(54) METHOD AND DEVICE FOR DATA ENCRYPTING

(71) Applicant: SAMSUNG ELECTRONICS CO., LTD., Suwon-si, Gyeonggi-do (KR)

(72) Inventor: Han-gil Moon, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/323,213

(22) PCT Filed: Aug. 26, 2015

(86) PCT No.: PCT/KR2015/008933
§ 371 (c)(1),
(2) Date: Dec. 30, 2016

(87) PCT Pub. No.: WO2016/036048
PCT Pub. Date: Mar. 10, 2016

(65) Prior Publication Data
US 2017/0163414 A1 Jun. 8, 2017

(30) Foreign Application Priority Data

Sep. 5, 2014 (KR) .......................... 10-2014-0119364

(51) Int. Cl.
*H04L 29/06* (2006.01)
*H04L 9/06* (2006.01)

(52) U.S. Cl.
CPC .......... *H04L 9/0631* (2013.01); *H04L 9/0618* (2013.01); *H04L 63/0428* (2013.01)

(58) Field of Classification Search
CPC .. H04L 9/0631; H04L 63/0428; H04L 9/0618
See application file for complete search history.

(56) References Cited

U.S. PATENT DOCUMENTS

| 7,359,515 B2 | 4/2008 | Furuya et al. |
| 8,494,155 B1 | 7/2013 | Poo et al. |
| (Continued) | | |

FOREIGN PATENT DOCUMENTS

| JP | 2002-305517 | 10/2002 |
| JP | 2003-333036 | 11/2003 |
| (Continued) | | |

OTHER PUBLICATIONS

International Search Report and Written Opinion of the ISA for PCT/KR2015/008933 dated Jan. 27, 2016, 10 pages.

(Continued)

*Primary Examiner* — Michael Pyzocha
(74) *Attorney, Agent, or Firm* — Nixon & Vanderhye, P.C.

(57) ABSTRACT

A method of encrypting data transmitted from a first device to a second device, performed by using an Advanced Encryption Standard (AES) encryption algorithm, includes obtaining size information of an encryption key and size information of data that is to be encrypted and includes a plurality of bits; encrypting a first bit group, which is at least one bit corresponding to a size of the encryption key, among the plurality of bits, by using the encryption key; selecting a third bit group, which is at least one bit of the encrypted first bit group based on size information of the encryption key and a size of a second bit group including bits that are different from the first bit group among the plurality of bits; and encrypting the second bit group and the selected third bit group by using the encryption key.

13 Claims, 14 Drawing Sheets

(56) References Cited

U.S. PATENT DOCUMENTS

| | | | |
|---|---|---|---|
| 2005/0262573 A1 | 11/2005 | Bo et al. | |
| 2008/0091943 A1* | 4/2008 | Wu | G06F 21/85 |
| | | | 713/165 |
| 2008/0170693 A1 | 7/2008 | Spies et al. | |
| 2008/0187132 A1 | 8/2008 | Sung et al. | |
| 2008/0192924 A1* | 8/2008 | Shang | H04L 9/0618 |
| | | | 380/28 |
| 2011/0119480 A1 | 5/2011 | Massoudi et al. | |
| 2011/0194693 A1 | 8/2011 | Izu et al. | |
| 2011/0317837 A1* | 12/2011 | Smith | H04L 9/0656 |
| | | | 380/259 |
| 2013/0195266 A1 | 8/2013 | Fischer | |
| 2014/0372760 A1* | 12/2014 | Teufel | H04L 9/0822 |
| | | | 713/171 |

FOREIGN PATENT DOCUMENTS

| | | |
|---|---|---|
| JP | 2011-151689 | 8/2011 |
| KR | 10-2008-0072345 | 8/2008 |

OTHER PUBLICATIONS

Extended European Search Report dated Dec. 4, 2017 for counterpart EP Application No. 15838583.1.
Cook, Debra L. et al: "Elastic Block Ciphers", International Association for Cryptologic Research, Jul. 6, 2004, pp. 1-17, XP061000892.
Bellare, M. et al: "On the Construction of Variable-Input-Length Ciphers", Jan. 1, 1999, pp. 231-244, XP000892788.

* cited by examiner

[Fig. 1]
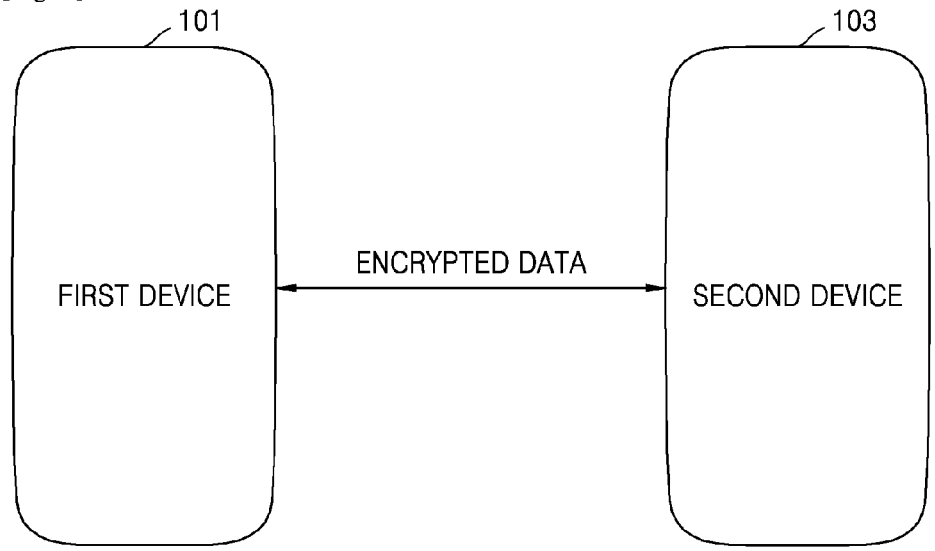
[Fig. 2]
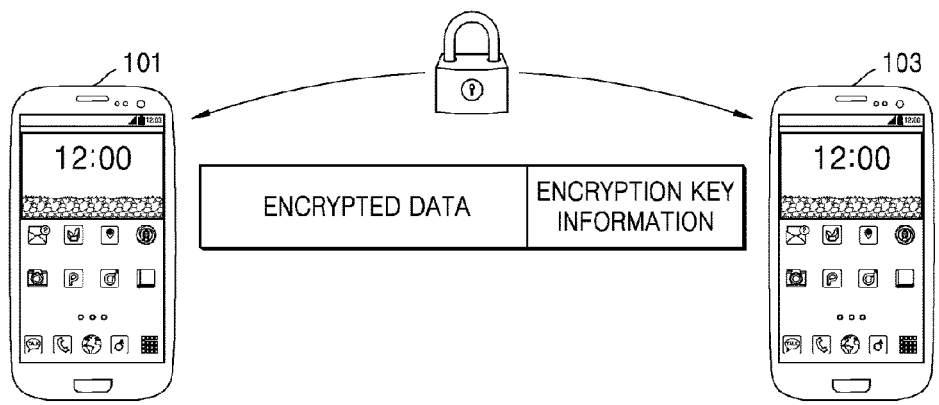
[Fig. 3]
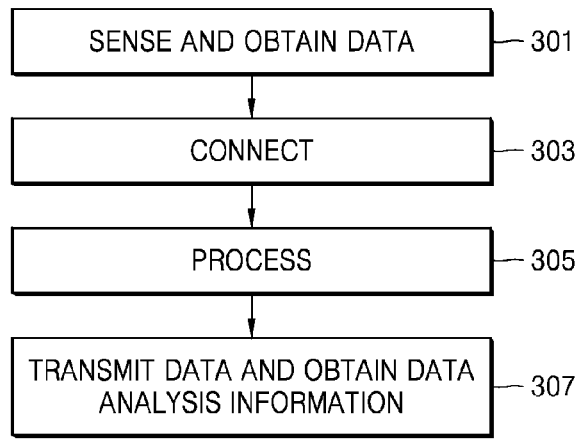

[Fig. 4a]
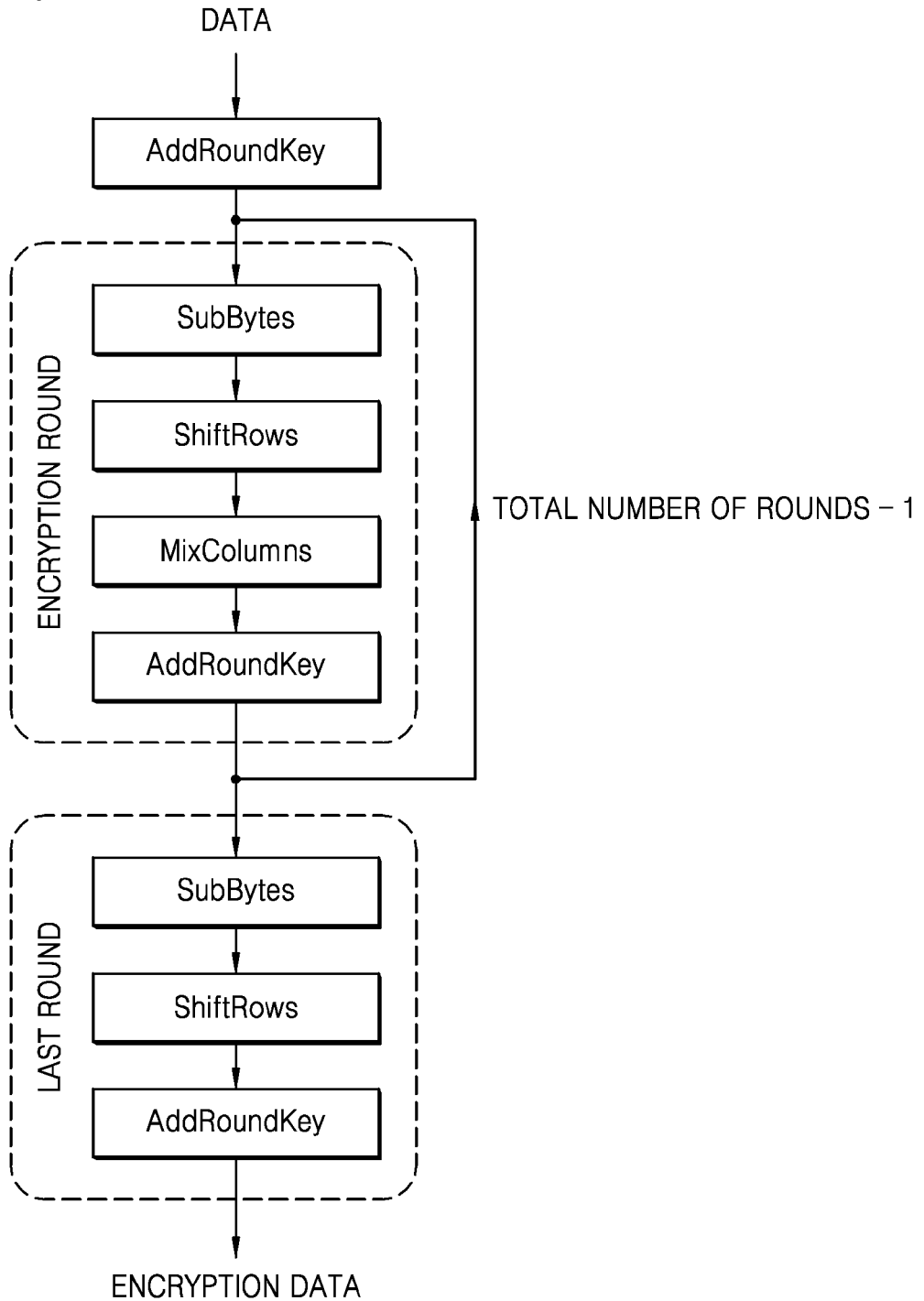

[Fig. 4b]
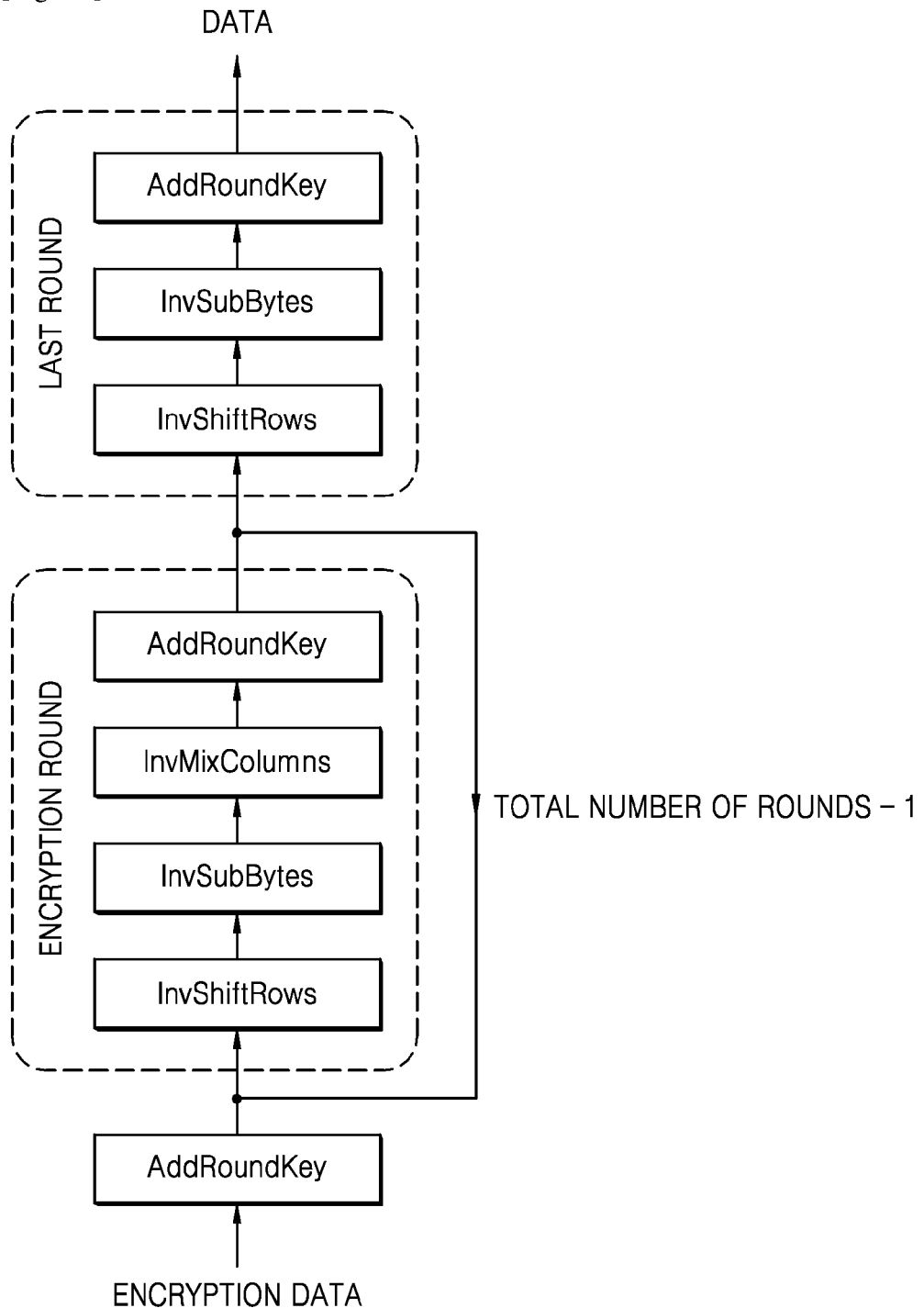

[Fig. 5]
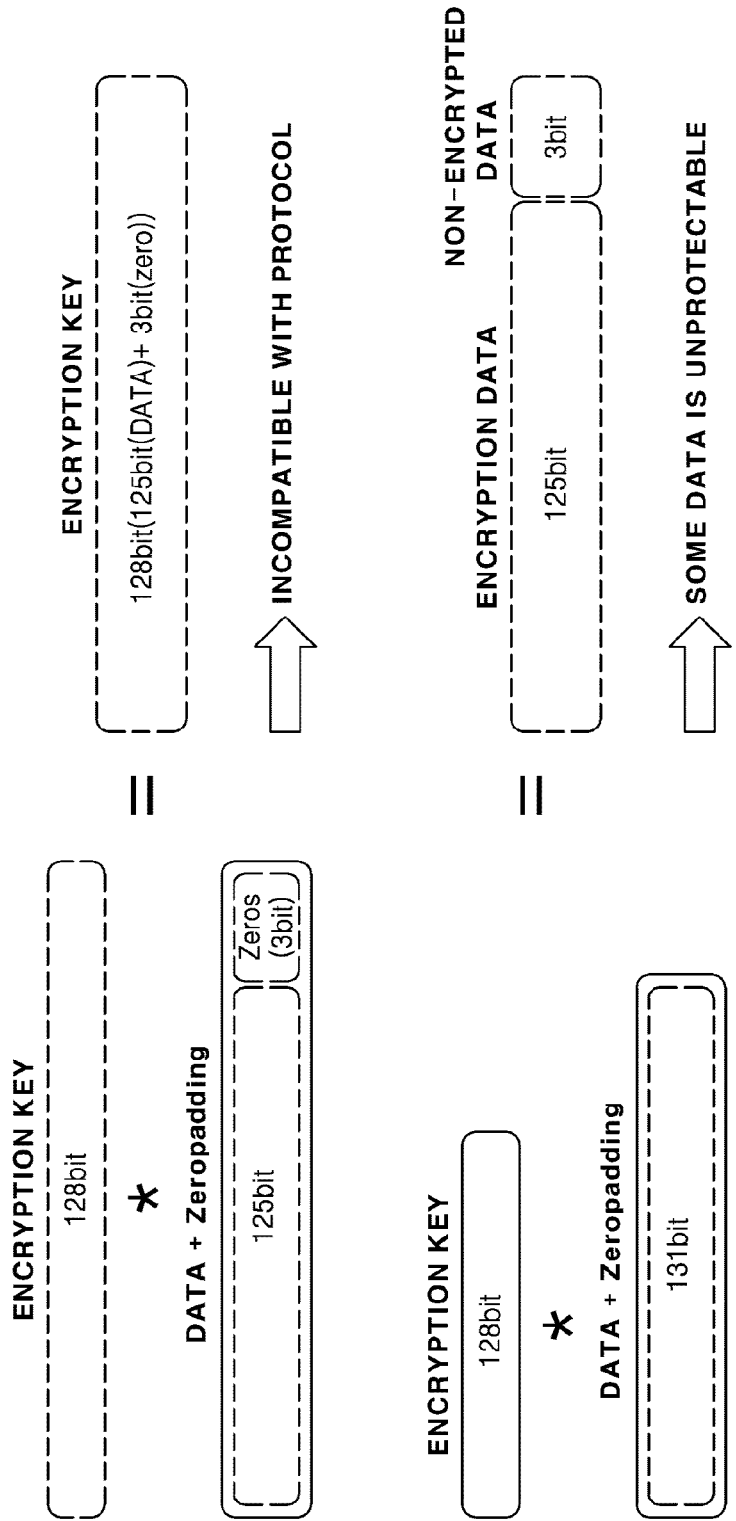

[Fig. 6]
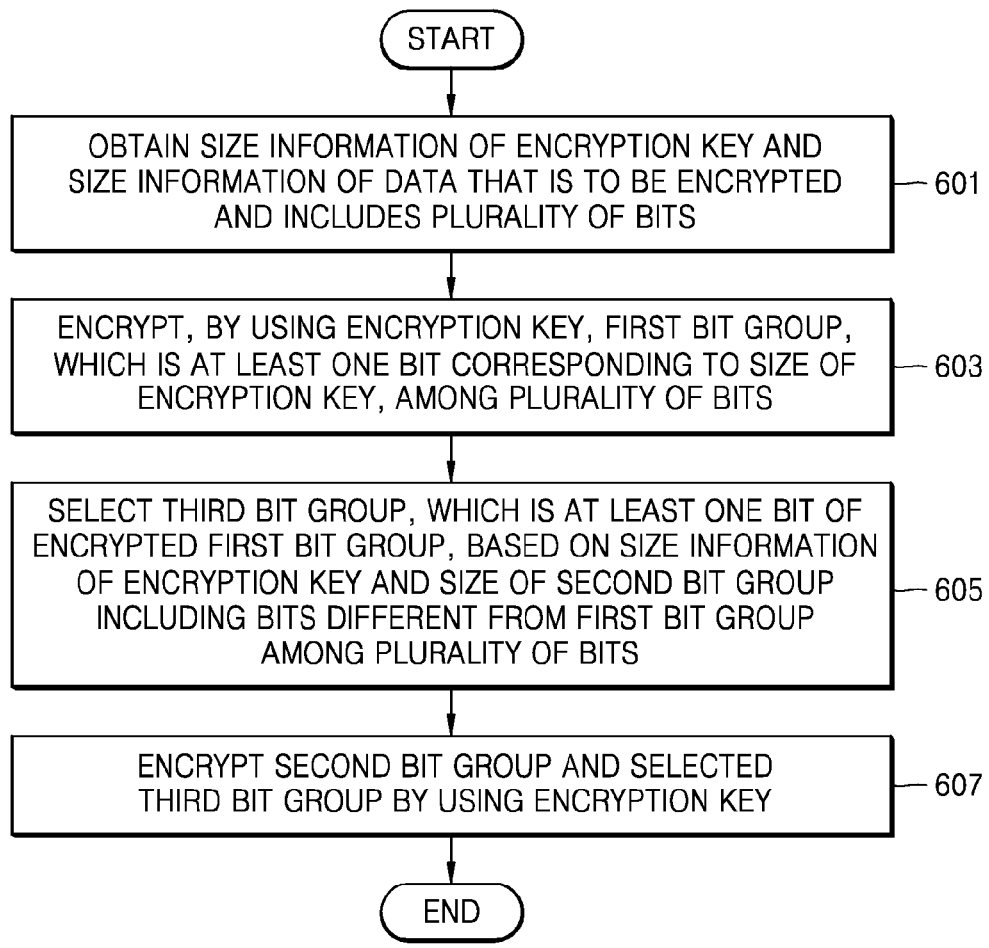

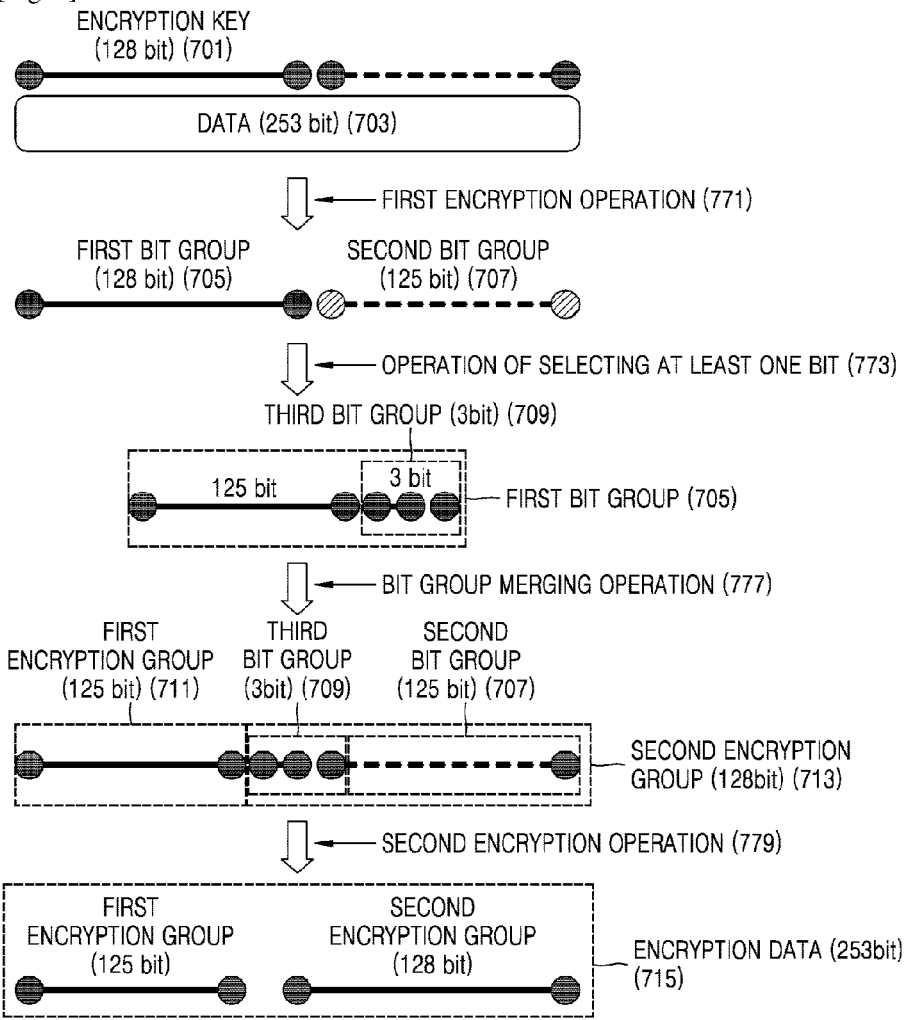
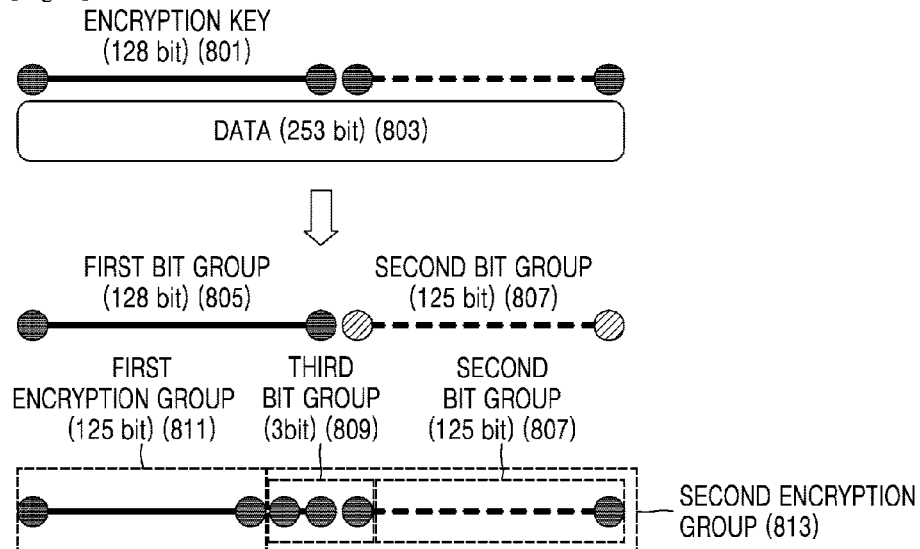

[Fig. 9]
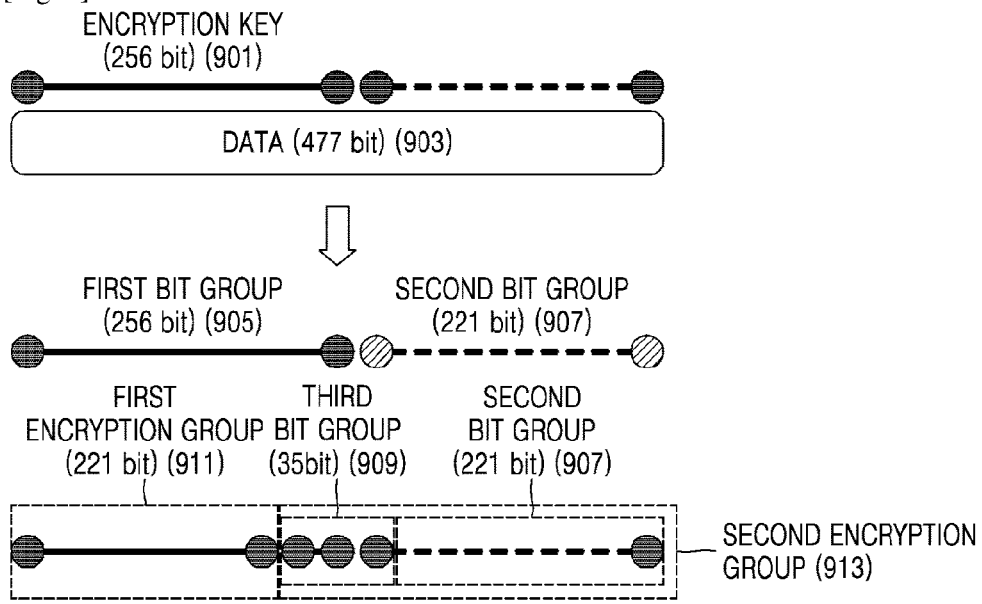
[Fig. 10]
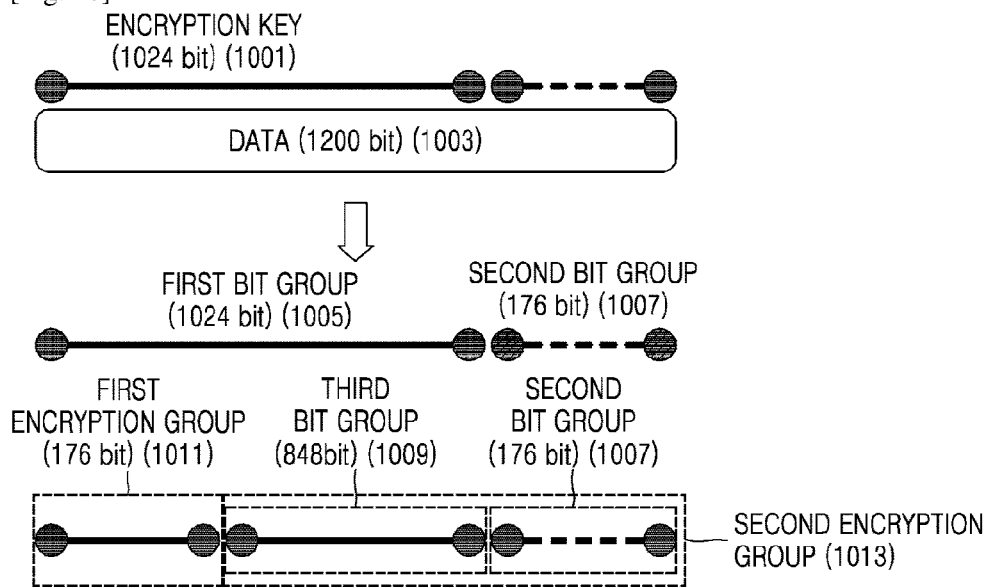

[Fig. 11]
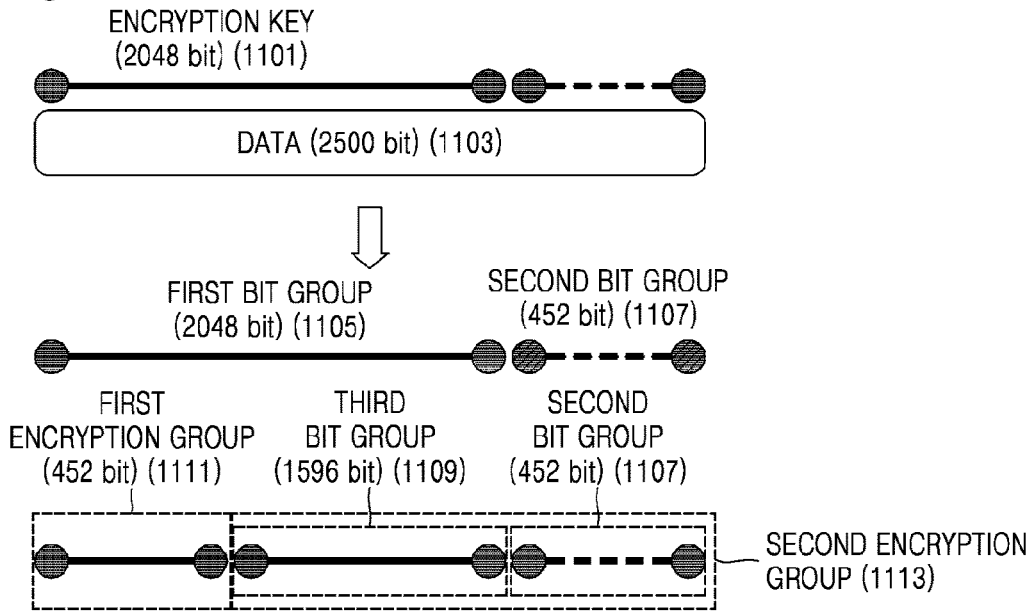
[Fig. 12]
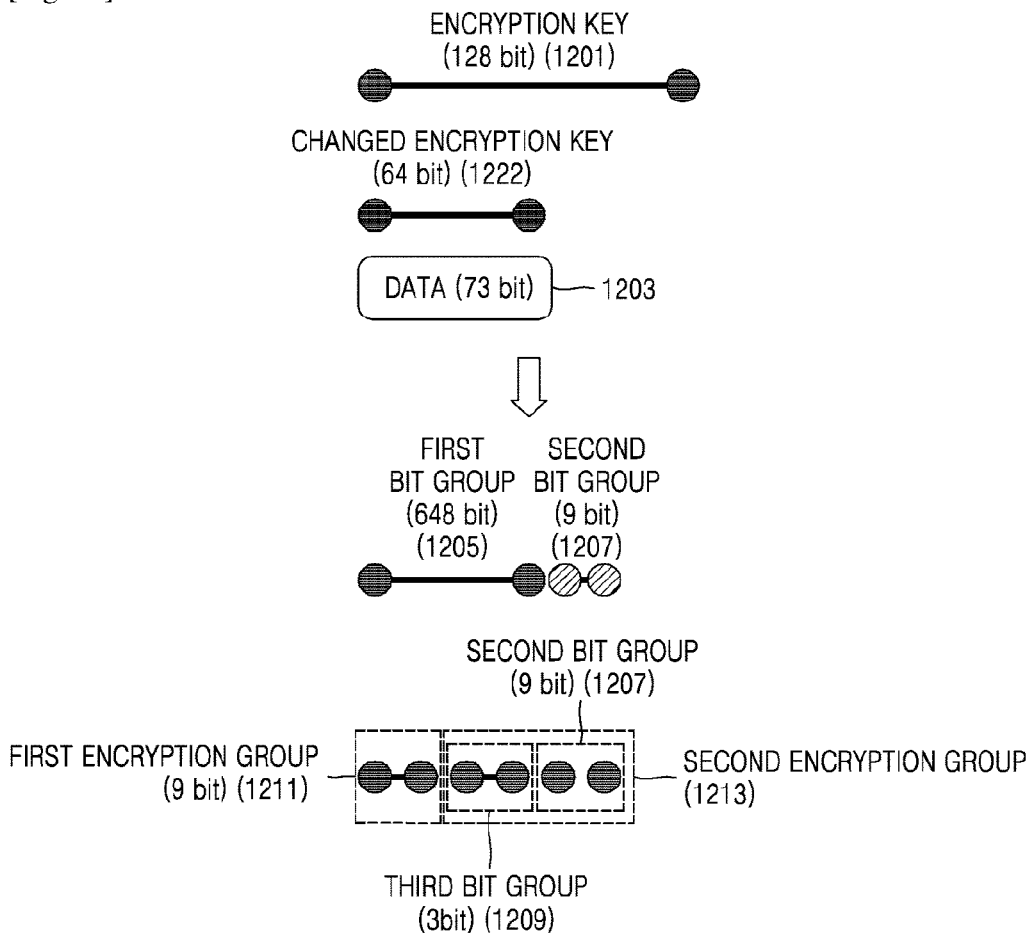

[Fig. 13]
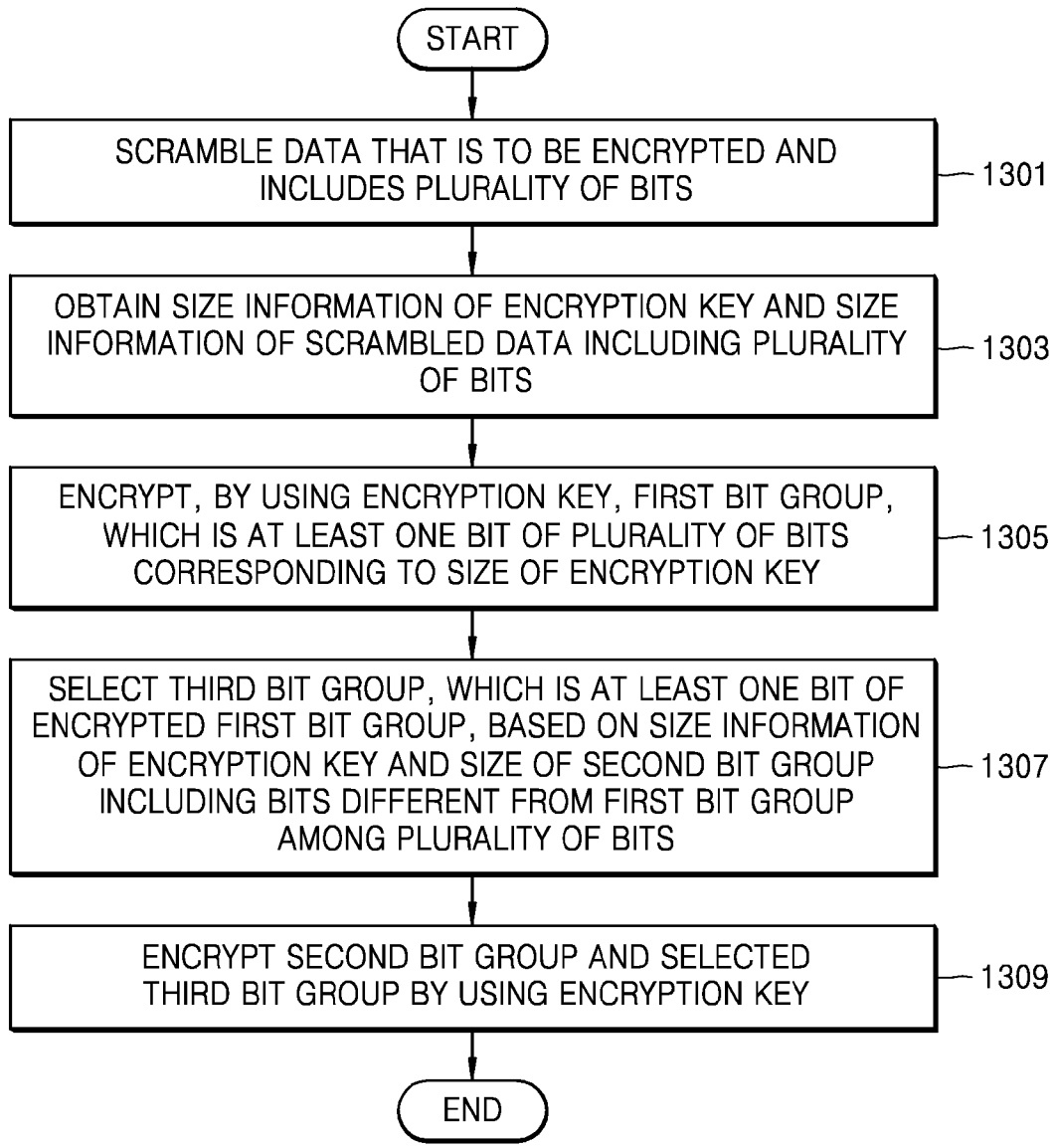

[Fig. 14]
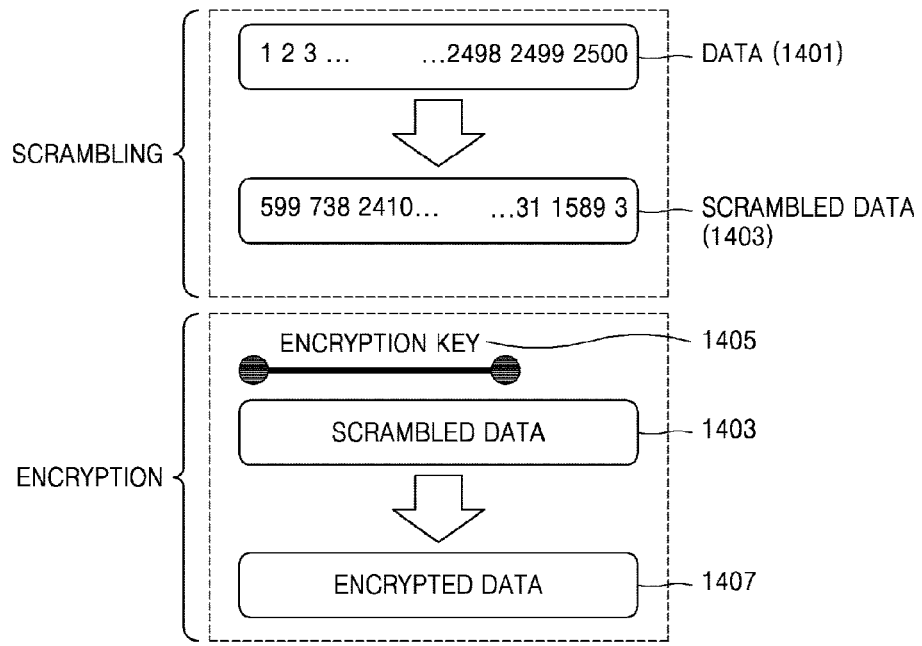
[Fig. 15]
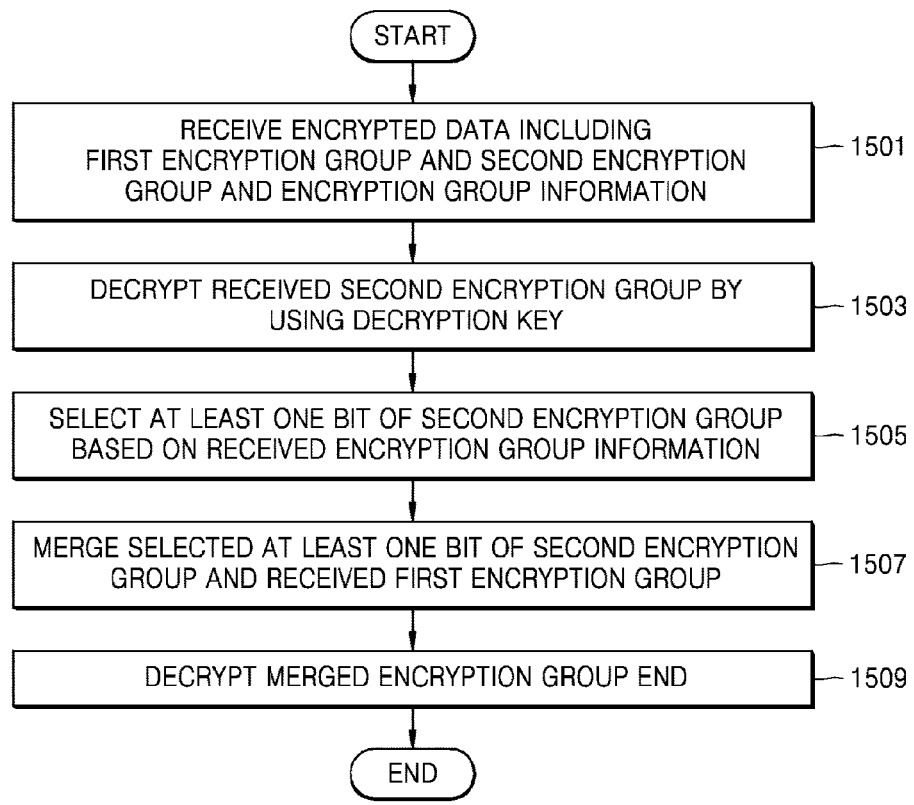

[Fig. 16]
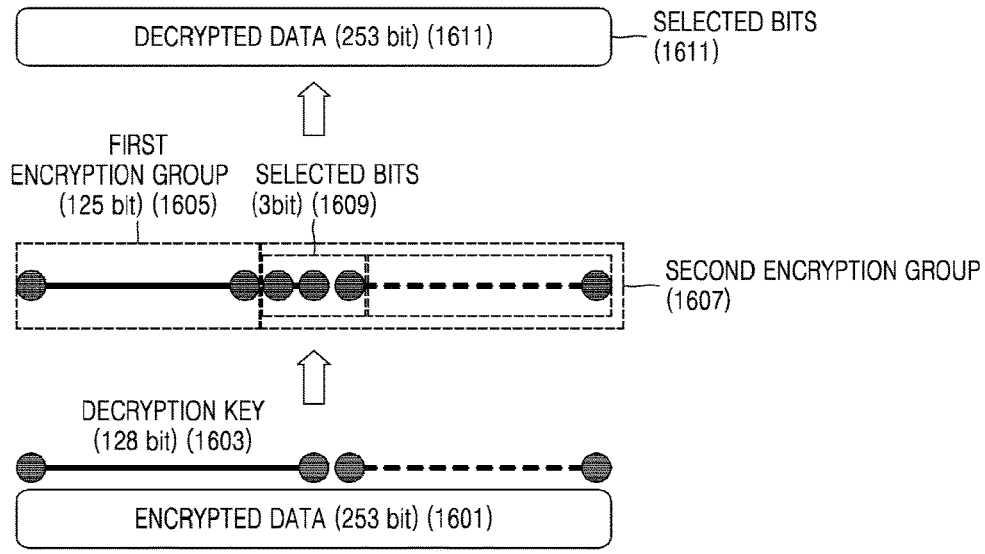
[Fig. 17]
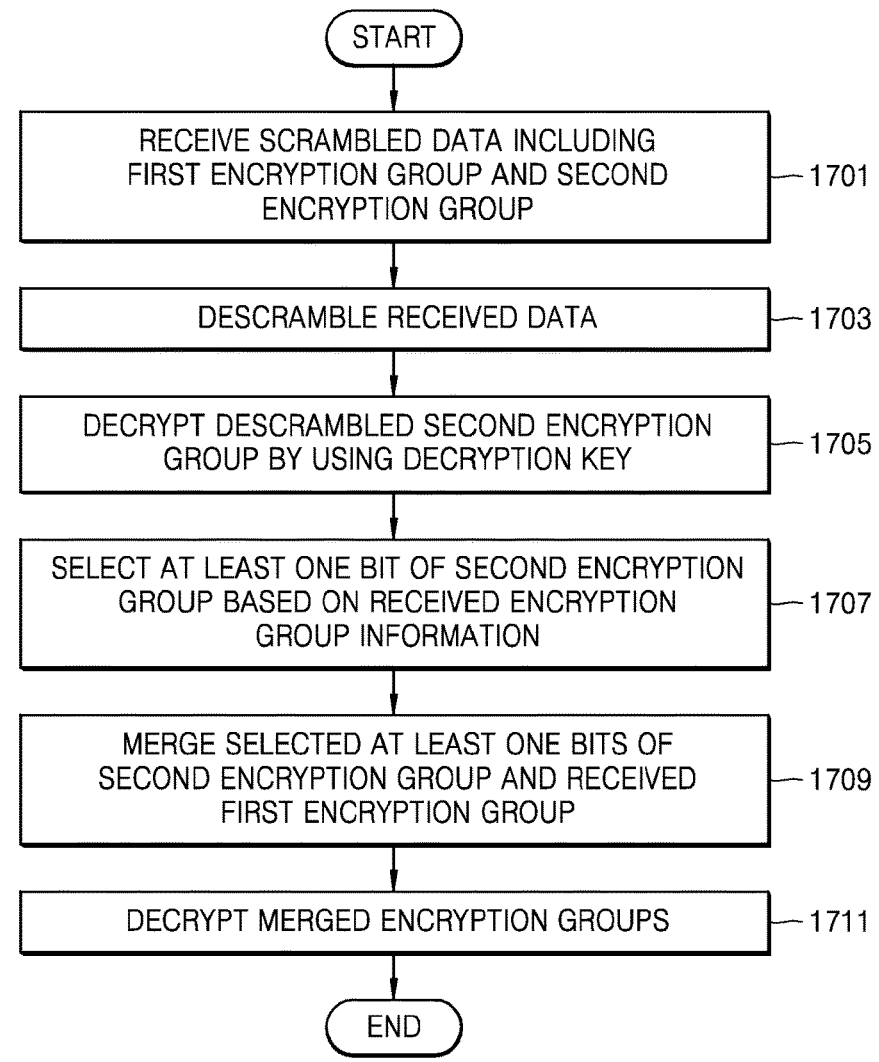

[Fig. 18]
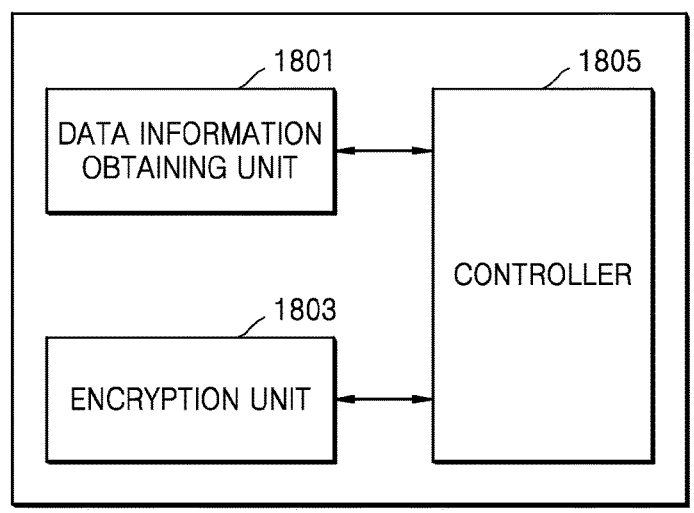
[Fig. 19]
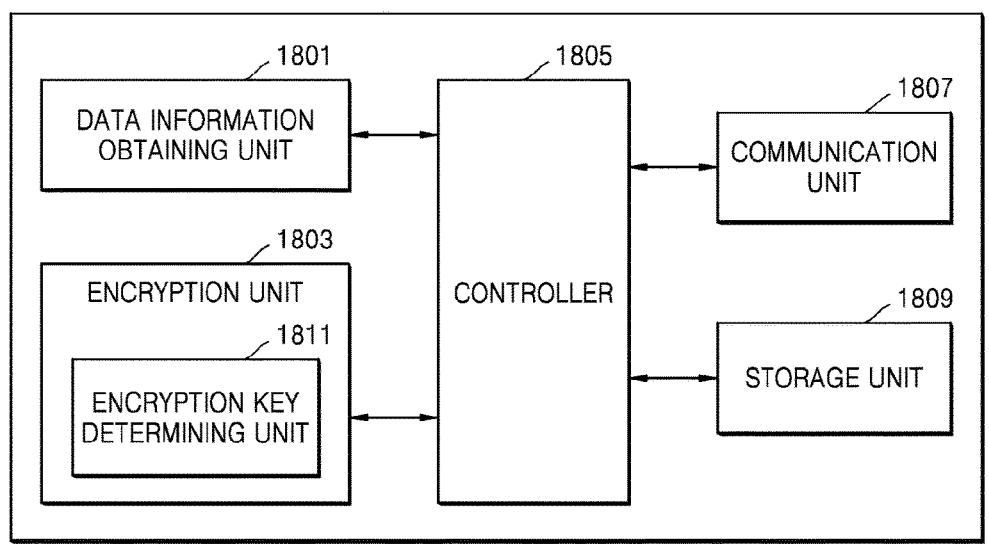

[Fig. 20]
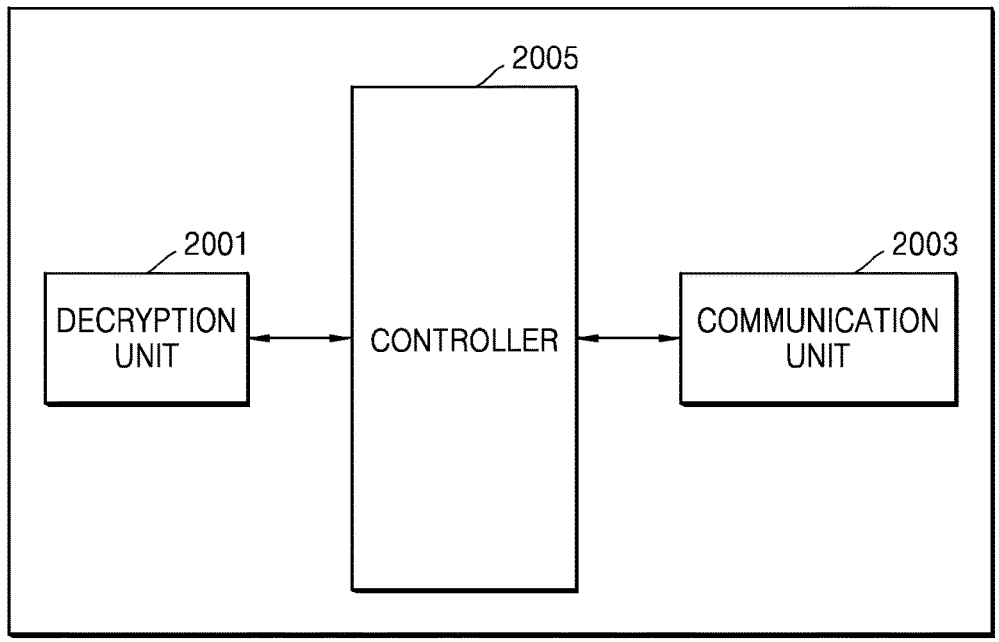
[Fig. 21]
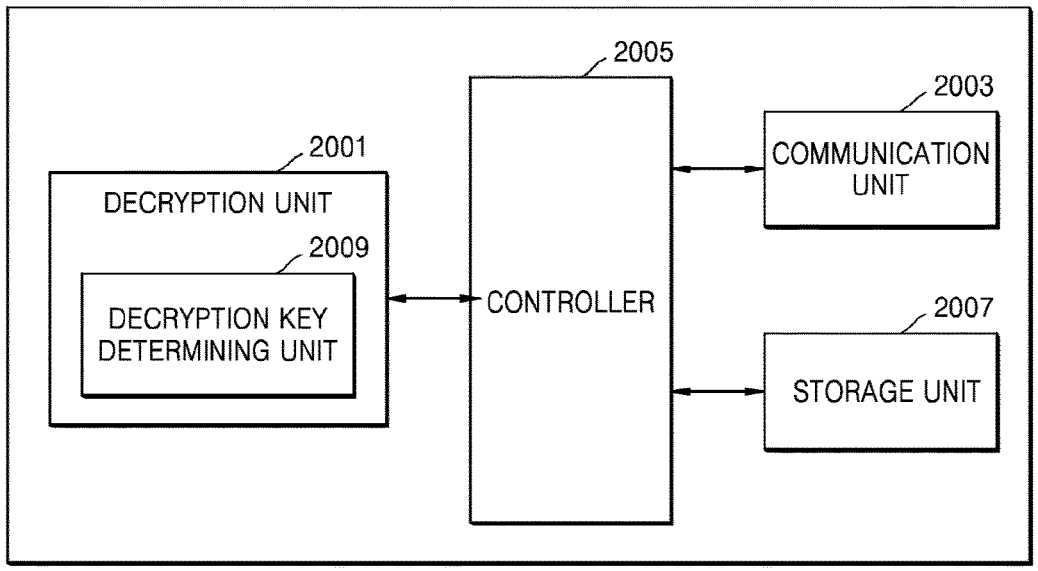

[Fig. 22]
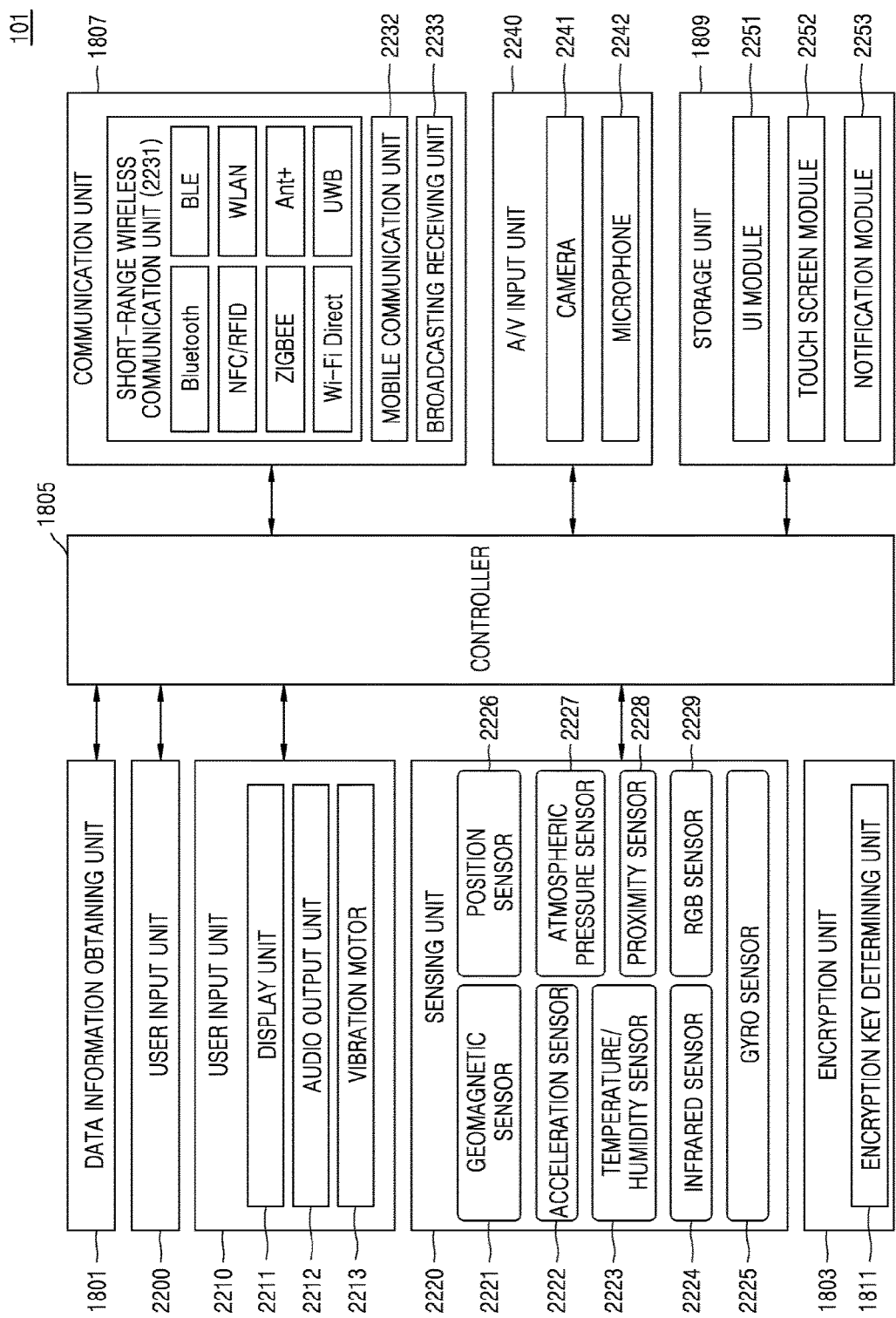

METHOD AND DEVICE FOR DATA ENCRYPTING

This application is the U.S. national phase of International Application No. PCT/KR2015/008933, filed Aug. 26, 2015, which designates the U.S. and claims priority to KR Patent Application No. 10-2014-0119364 filed Sep. 5, 2014, the entire contents of each of which are hereby incorporated by reference.

TECHNICAL FIELD

One or more exemplary embodiments relate to a method of encrypting data, and more particularly, to a method and device for encrypting and transmitting data.

BACKGROUND ART

Transmission or reception of data using a device has recently been rapidly increased. Due to the rapid increase in transmission and reception of data, the need for security of data being transmitted or received is also increasing.

An encryption process using an encryption algorithm is needed to maintain security of data being transmitted or received between devices. An encryption algorithm is an algorithm whereby data is encrypted using an encryption key and outputs the encrypted data. Examples of the encryption algorithms are Message-Digest algorithm (MD5), a Secure Hash Algorithm (SHA), a Rivest Shamir Adleman (RSA), and Advanced Encryption Standard (AES).

Formats of data being transmitted or received between devices have recently been diversified, and communication methods whereby the devices are connected to each other are also various such as a wired communication method, a wireless communication method, a short-range communication method, or a long-range communication method. Thus, communication is performed according to various protocols and standards enabling data of a predetermined size to be transmitted or received every predetermined time. However, predetermined encryption algorithms such as an AES encryption algorithm allows encryption of data of only a predetermined size, and thus, it is difficult to perform communication according to predetermined protocols and standards.

Thus, an encryption process that allows easy communication according to various protocols and standards is needed.

DISCLOSURE OF INVENTION

Technical Problem

An encryption process that allows easy communication according to various protocols and standards is needed.

Solution to Problem

One or more exemplary embodiments include a method of encrypting data of various sizes by using an Advanced Encryption Standard (AES) encryption algorithm.

Advantageous Effects of Invention

As described above, according to the one or more of the above exemplary embodiments, data of various sizes may be encrypted by using an AES encryption algorithm.

BRIEF DESCRIPTION OF DRAWINGS

FIG. 1 is a diagram illustrating devices transmitting or receiving data, according to exemplary embodiments;

FIG. 2 is a diagram illustrating a method of transmitting or receiving data, according to exemplary embodiments;

FIG. 3 is a diagram illustrating a method of obtaining and providing data by using a device, according to exemplary embodiments;

FIG. 4a is a diagram illustrating an Advanced Encryption Standard (AES) encryption algorithm according to exemplary embodiments;

FIG. 4b is a diagram illustrating an AES decryption algorithm according to exemplary embodiments;

FIG. 5 is a diagram illustrating an AES decryption method according to a size of data, according to exemplary embodiments;

FIG. 6 is a diagram illustrating a data encryption method according to exemplary embodiments;

FIG. 7 is a detailed diagram illustrating a data encryption method according to exemplary embodiments;

FIGS. 8 through 12 are diagrams illustrating a method of encrypting data of various sizes, according to exemplary embodiments;

FIG. 13 is a flowchart illustrating a method of scrambling and encrypting data, according to exemplary embodiments;

FIG. 14 is a diagram illustrating a method of scrambling and encrypting data, according to exemplary embodiments;

FIG. 15 is a flowchart illustrating a data decryption method according to exemplary embodiments;

FIG. 16 is a detailed diagram illustrating a data decryption method according to exemplary embodiments;

FIG. 17 is a flowchart illustrating a method of descrambling and decrypting data, according to exemplary embodiments;

FIGS. 18 and 19 are block diagrams illustrating a first device performing encryption, according to exemplary embodiments;

FIGS. 20 and 21 are block diagrams illustrating a second device performing encryption, according to exemplary embodiments; and FIG. 22 is a detailed block diagram illustrating an encryption device according to exemplary embodiments.

BEST MODE FOR CARRYING OUT THE INVENTION

According to one or more exemplary embodiments, a method of encrypting data transmitted from a first device to a second device, wherein the method is performed by using an Advanced Encryption Standard (AES) encryption algorithm and includes: obtaining size information of an encryption key and size information of data that is to be encrypted and includes a plurality of bits; encrypting a first bit group, which is at least one bit corresponding to a size of the encryption key, among the plurality of bits, by using the encryption key; selecting a third bit group, which is at least one bit of the encrypted first bit group based on size information of the encryption key and a size of a second bit group including bits that are different from the first bit group among the plurality of bits; and encrypting the second bit group and the selected third bit group by using the encryption key.

The method may further include transmitting at a time a first encryption group corresponding to the encrypted first bit group, from which the third bit group is excluded, and a second encryption group, in which the second bit group and the third bit group are merged, to the second device.

The method may further include transmitting encryption group information including information about the selected third bit group, to the second device.

The transmitting may include transmitting a group in which the first encryption group and the second encryption group are merged, for every predetermined period.

The method may further include determining whether a size of the data to be encrypted is a multiple of the size of the encryption key.

The obtaining of size information of the encryption key and size information of data that is to be encrypted and includes a plurality of bits may further include changing the encryption key to a predetermined size if the size of the encryption key is greater than a size of the data to be encrypted.

The method may further include scrambling the data that is to be encrypted and includes a plurality of bits.

A size of the third bit group may be identical to a difference between the size of the encryption key and the size of the second bit group.

The encrypting the first bit group may further include storing the encrypted first bit group, and the selecting of the third bit group may include selecting a third bit group which is at least one bit of the stored first bit group.

The selecting of the third bit group may include: deleting the selected third bit group from the first bit group and merging the third bit group with the second bit group; and encrypting a group in which the third bit group and the second bit group are merged.

According to one or more exemplary embodiments, a method of decrypting data that is encrypted by using an Advanced Encryption Standard (AES) encryption algorithm, includes: receiving encrypted data including a first encryption group and a second encryption group and encryption group information; decrypting the received second encryption group by using a decryption key; selecting at least one bit of the second encryption group based on the received encryption group information; merging the selected at least one bit of the second encryption group with the received first encryption group; and decrypting the merged encryption groups.

The method may further include descrambling the received data.

The decrypting the received second encryption group by using the decryption key may further include storing the decrypted second encryption group, and the selecting of at least one bit of the second encryption group based on the received encryption group information may further include selecting at least one bit of the stored second encryption group based on the received encryption group information.

The encryption group information may include information about at least one bit in the second encryption group needed to decrypt the first encryption group.

The decrypting of the received second encryption group by using the decryption key may include selecting a decryption key corresponding to the received second encryption group.

According to one or more exemplary embodiments, a computer-readable recording medium having embodied thereon a program for executing the method described above is included.

According to one or more exemplary embodiments, a device for encrypting data by using an Advanced Encryption Standard (AES) encryption algorithm, includes: a data information obtaining unit for obtaining size information of an encryption key and size information of data that is to be encrypted and includes a plurality of bits; and an encryption unit for encrypting a first bit group, which is at least one bit corresponding to a size of the encryption key, among the plurality of bits, by using the encryption key, selecting a third bit group, which is at least one bit of the encrypted first bit group, based on size information of the encryption key and a size of a second bit group including bits that are different from the first bit group, among the plurality of bits, and encrypting the second bit group and the selected third bit group by using the encryption key.

The device may further include a communication unit for transmitting at a time a first encryption group corresponding to the encrypted first bit group, from which the third bit group is excluded, and a second encryption group in which the second bit group and the third bit group are merged.

The device may further include a communication unit for transmitting encryption group information including information about the selected third bit group.

The communication unit may transmit at a time a group in which the first encryption group and the second encryption group are merged, for every predetermined period.

The encryption unit may determine whether a size of the data to be encrypted is a multiple of the size of the encryption key.

The encryption unit may further include an encryption key determining unit for changing the encryption key to a predetermined size if the obtained size information of the encryption key is greater than the obtained size information of the data to be encrypted.

The device may further include a scrambling unit for scrambling the data that is to be encrypted and includes a plurality of bits.

A size of the third bit group may be identical to a difference between the size of the encryption key and the size of the second bit group.

The device may further include a storage unit for storing the encrypted first bit group, wherein the encryption unit selects a third bit group, which is at least one bit of the first bit group stored in the storage unit.

The encryption unit may delete the selected third bit group from the first bit group, merge the third bit group with the second bit group, and encrypt a group in which the third bit group and the second bit group are merged.

According to one or more exemplary embodiments, a device for decrypting data that is encrypted by using an Advanced Encryption Standard (AES) encryption algorithm, includes: a communication unit for receiving encrypted data including a first encryption group and a second encryption group and encryption group information; and a decryption unit for decrypting the received second encryption group by using a decryption key, selecting at least one bit of the second encryption group based on the received encryption group information, merging the selected at least one bit of the second encryption group with the received first encryption group, and decrypting the merged encryption group.

The device may further include a descrambling unit for descrambling the received data.

The device may further include a storage unit for storing the decrypted second encryption group, wherein the decryption unit selects at least one bit of the stored second encryption group based on the received encryption group information.

The encryption group information may include information about at least one bit in the second encryption group needed to decrypt the first encryption group.

The decryption unit may include a decryption key determining unit for selecting a decryption key corresponding to the received second encryption group.

MODE FOR THE INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the inventive concept will now be described more fully with reference to the accompanying drawings, in which exemplary embodiments of the inventive concept are shown such that one of ordinary skill in the art may easily work the inventive concept. This inventive concept may, however, be embodied in many different forms and should not be construed as limited to the embodiments set forth herein. Also, elements not related to description are omitted in the drawings for clear description of the inventive concept, and like reference numerals in the drawings denote like elements throughout the specification.

In the present specification, when a constituent element is connected to another constituent element, the constituent element is connected to the other constituent element not only directly but also electrically through at least one of other constituent elements interposed therebetween. Also, when a part may include a certain constituent element, unless specified otherwise, it may not be construed to exclude another constituent element but may be construed to further include other constituent elements.

FIG. 1 is a diagram illustrating devices transmitting or receiving data, according to exemplary embodiments.

Referring to FIG. 1, a first device 101 may transmit or receive data to or from a second device 103. According to exemplary embodiments, the first device 101 may transmit encrypted data to the second device 103. Also, the first device 101 may obtain information, generate data based on the obtained information, and encrypt the generated data. In addition, the first device 101 may transmit the encrypted data and information that may be used by the second device 103 to decrypt the encrypted data, to the second device 103. Also, the first device 101 may scramble data to be transmitted. A method of encrypting data by the first device 101 according to exemplary embodiments will be described in detail with reference to FIG. 6.

According to exemplary embodiments, the second device 103 may receive encrypted data. The second device 103 may decrypt the received, encrypted data. According to exemplary embodiments, if the second device 103 receives scrambled encryption data, the second device 103 may descramble the received data and then decrypt the same.

According to some exemplary embodiments, the first and second devices 101 and 103 may be a smartphone, a smart TV, a mobile phone, a personal digital assistant (PDA), a laptop, a media player, a microserver, a global positioning system (GPS) device, an e-book terminal, a digital broadcasting terminal, a navigation device, a kiosk, a MP3 player, a digital camera, or other mobile or non-mobile computing devices. Also, the first and second devices 101 and 103 may include various devices whereby a touch input may be received, such as an electronic blackboard or a touch table. However, the first and second devices 101 and 103 are not limited to these examples.

According to some exemplary embodiments, the second device 103 may be an external device or a server, and is not limited to these examples.

According to some exemplary embodiments, the first device 101 and the second device 103 may each be a device including a display unit.

According to some exemplary embodiments, the first device 101 and the second device 103 may receive a user input via various user interfaces such as a mouse, a keyboard, a touch pad, a trackball, an electronic pen, or a touch screen. However, the user interface is not limited to these examples.

FIG. 2 is a diagram illustrating a method of transmitting or receiving data, according to exemplary embodiments.

According to some exemplary embodiments, a first device 101 may transmit data to a second device 103 according to a predetermined protocol. A protocol refers to rules and procedures about communication methods for transmitting or receiving information between computers, and various protocols are available. Protocols are obvious to one of ordinary skill in the art, and thus detailed description thereof will be omitted.

According to some exemplary embodiments, the first device 101 may transmit data to the second device 103 according to various protocols corresponding to a communication method between the first device 101 and the second device 103 and types of data transmitted or received between the first device 101 and the second device 103. Also, a size of data transmitted or received between the first device 101 and the second device 103 at a time and an interval of transmission or reception may be determined based on a communication method between the first and second devices 101 and 103 and protocol types.

According to some exemplary embodiments, the first device 101 may encrypt data, and may transmit the encrypted data to the second device 103. According to some exemplary embodiments, the first device 101 may generate data according to a predetermined protocol to transmit the data to the second device 103.

Referring to FIG. 2, data transmitted by the first device 101 to the second device 103 may be encrypted data, and the first device 101 may provide the second device 103 with encryption key information that is used to decrypt the encrypted data. The second device 103 may receive data and encryption key information, and may decrypt the received data by using the received encryption key information.

According to some exemplary embodiments, encryption key information may include at least one of information about an encryption method and information about parameters or the like for which a set up between devices is needed for encryption and decryption, but is not limited thereto, and may include information needed in encryption and decryption.

FIG. 3 is a diagram illustrating a method of obtaining and providing data by using a device, according to exemplary embodiments.

In operation 301, a first device may perform sensing and obtaining data. According to some exemplary embodiments, the first device may generate data based on sensed information or may obtain data from an external device.

According to some exemplary embodiments, the first device may obtain various types data through sensing. For example, the first device may obtain data related to body temperature, blood flow, or pulse waves from an electrode, an optical sensor, or a temperature sensor, and may also obtain medical images or activity information from the second device.

In operation 303, the first device may perform connection to the second device. A connection method between the first device and the second device may be short-range communication or mobile communication. Examples of the short-range communication may include Bluetooth communication, Bluetooth Low Energy (BLE) communication, near field communication, WLAN communication, ZigBee communication, Infrared Data Association (IrDA) communication, Wi-Fi Direct communication, Ultra Wideband (UWB) communication, and Ant+ communication, but are not limited thereto. Also, examples of the mobile communication may include a method of transmitting or receiving a wireless signal to or from at least one of a base station, an external terminal, and a server on a mobile communication network. Examples of a wireless signal may include a voice call signal, a video call signal, or various types of data according to transmission and reception of text or multimedia messages. Types of data provided by the first device to the second device and a period of providing the data may be different according to a communication method used by the first device to connect to the second device.

In operation 305, the first device may perform data processing. Data processing may be, for example, processing data into a predetermined format to provide data to the second device or processing data to use the data in an application of the first device. Examples of data processing may include encryption, decryption, scrambling, descrambling, encoding, decoding, multiplexing, demultiplexing, interleaving, deinterleaving, rendering, and packetization, and are not limited to these examples.

In operation 307, the first device may transmit data and obtain data analysis information. According to some exemplary embodiments, the first device may transmit data processed in operation 305 to the second device. Also, the first device may obtain data analysis information from the second device. Data analysis information is information obtained by analyzing data transmitted by the first device, and may be, for example, an amount of calorie consumption according to an activity amount, information indicating a heart rate, or control information such as an ACK signal, but are not limited to these examples.

According to some exemplary embodiments, the first device may obtain various data, and a size of data obtained by the first device and a period during which the first device obtains the data may be various. Also, the first device may use various protocols according to types of communication via which the first device is connected to the second device, and the first device may process obtained data into various data formats based on types of communication whereby it is connected to the second device, and may transmit the processed data to the second device through a communication link to which the first device is connected.

FIG. 4a is a diagram illustrating an AES encryption algorithm according to exemplary embodiments.

An AES encryption algorithm is a data encryption algorithm, and is a symmetric-key algorithm in which the same key is used for both encrypting and decrypting data. In an AES encryption method, at least one encryption round is repeated to perform data encryption. Data on which AES encryption is to be performed may be a matrix form.

According to some exemplary embodiments, data on which encryption is to be performed may include data in an encryption unit block.

According to some exemplary embodiments, an AES encryption key used in AES encryption may be 128 bits, 256 bits, or 1024 bits. According to some exemplary embodiments, an AES encryption key size may be a power of 2. In addition, an AES encryption key size may be modified to a power of 2. For example, if an AES encryption key stored in the first device is 128 bits, the first device may change the encryption key to 64 bits, and may perform encryption by using the encryption key of 64 bits. Hereinafter, each operation of AES encryption will be described.

Referring to FIG. 4a, the ADDRoundKey operation may include operating a round key generated based on an AES encryption key with data. A round key may include a key that is generated based on an encryption key used in each round for performing AES encryption. Also, a round key of a number corresponding to the number of rounds needed in encryption may be generated. A round key is obvious to one of ordinary skill in the art, and thus detailed description thereof will be omitted.

The SubBytes operation may include substituting data by using a predetermined substitution table called S-Box so as to provide linearity in encrypted data. For example, the SubBytes operation may include converting each byte to another byte which is inversely transformable using the S-Box. The S-Box is a substitution table obvious to one ordinary skill in the art, and thus detailed description thereof will be omitted.

The ShiftRows operation may include performing operation whereby a row of a matrix is shifted. For example, the ShiftRows operation may include operations of not changing a first row, shifting each byte of a second row to the left, shifting each byte of a third row by offsets of two, and shifting each byte of a fourth row by offsets of three. However, the ShiftRows operation is not limited thereto.

The Mixcolumns operation includes an operation of mixing columns, and may include performing operation whereby columns are mixed through multiplication with a predetermined matrix.

According to some exemplary embodiments, the number of rounds in an AES encryption algorithm may be determined based on a length of an encryption key or a length of data corresponding to the encryption key. The first device may perform encryption of data based on the determined number of rounds. Also, the first device may not perform the Mixcolumns operation in a last round.

FIG. 4b is a diagram illustrating an AES decryption algorithm according to exemplary embodiments.

An AES decryption algorithm may include an algorithm whereby data that is encrypted by using an AES encryption algorithm is decrypted. For example, an AES decryption algorithm may include an algorithm whereby data encrypted by using the AES encryption algorithm of FIG. 4a is decrypted. According to some exemplary embodiments, an AES decryption algorithm may have a reverse order of an AES encryption algorithm. Hereinafter, operations performed in an AES decryption algorithm will be described.

Referring to FIG. 4b, the AddRoundKey operation corresponds to description with reference to FIG. 4a, and thus detailed description thereof will be omitted.

The InvShiftRow operation may include performing an inverse operation of the operation performed in the ShiftRow operation of FIG. 4a. In detail, the InvShiftRow operation may include shifting a row of a matrix in a reverse order to that of the ShiftRow operation of FIG. 4a.

The InvSubBytes operation may include performing an inverse operation to the operation performed in the SubBytes operation. In detail, the InvSubBytes operation may include reversing bytes that are substituted in the operation of FIG. 4a to a previous state.

The InvMixColumns operation may include performing an inverse operation to the operation performed in the MixColumns operation of FIG. 4a. In detail, the InvMixColumns operation may include reversing columns that are mixed in the MixColumns operation of FIG. 4a to a previous state.

FIG. 5 is a diagram illustrating an AES encryption method according to a size of data, according to exemplary embodiments.

According to AES encryption, data is encryptable only when a size of an encryption unit (encryption unit block) for data encryption at a time is a predetermined size. For example, a device that performs AES encryption may encrypt only data having a size that is the same as that of an encryption key or a size corresponding to a multiple of the size of the encryption key.

Referring to FIG. 5, if a size of data to be encrypted does not correspond to a size of an encryption key or is not a predetermined multiple of an encryption key, a device may perform Zero padding, in which 0 is added to data, or the like, in order to allow the size of data to be encrypted, to correspond to an encryption key or may encrypt only a portion of data of a size corresponding to an encryption key and omit encryption with respect to the remaining portion of the data.

However, when performing encryption according to the method FIG. 5, the security of a non-encrypted portion may be problematic, or a data size is changed and it may be difficult to perform communication according to a predetermined protocol.

For example, for a device that performs communication according to a predetermined protocol, in which a frame having 253 bits is transmitted or received at a predetermined interval, if 0 (zero) of 3 bits is added to data for AES encryption, the data may be AES-encrypted, but communication between device is not possible by including encrypted data in one frame. Thus, a channel bandwidth may be wasted, and it may be difficult to control traffic.

FIG. 6 is a diagram illustrating a data encryption method according to exemplary embodiments.

According to some exemplary embodiments, a first device may encrypt various sizes of data without changing a data size. A data size may refer to a size of data that is encrypted at a time, a size of an encryption unit block, a size of data that is transmitted at a time, a size of data included in a packet, or the like, and is not limited to these examples.

According to some exemplary embodiments, the first device may AES-encrypt data without changing a data size.

In operation 601, the first device may obtain size information of an encryption key and size information of data that is to be encrypted and includes a plurality of bits.

According to some exemplary embodiments, data that is to be encrypted and includes a plurality of bits may be an encryption unit block. An encryption unit block may refer to a unit whereby encryption is performed. For example, when a first device performs encryption by 256 bits or 1024 bits, 256 bits or 1024 bits may be referred to as an encryption unit block.

According to some exemplary embodiments, a size of an encryption key may be a power of 2. For example, an encryption key may have at least one of sizes of 64 bits, 128 bits, 192 bits, 256 bits, 1024 bits, and 2048 bits.

According to some exemplary embodiments, the first device may compare a size of an encryption key with a size of data to be encrypted. When a size of data to be encrypted corresponds to that of an encryption key (for example, if a size of data to be encrypted is the same as that of an encryption key or a size of data to be encrypted is a multiple of a size of an encryption key), encryption may be performed by using the encryption key stored in a device.

Also, according to some exemplary embodiments, if a size of an encryption key is greater than a size of data to be encrypted, the first device may change the size of the encryption key. According to some exemplary embodiments, the first device may divide a size of an encryption key by 2. For example, an encryption key of 128 bits may be changed to an encryption key of 64 bits. Also, when the size of the encryption key is changed, the first device may perform following operations by using the changed encryption key.

In operation 603, the first device may encrypt, by using an encryption key, a first bit group, which is at least one bit corresponding to a size of an encryption key, of a plurality of bits.

According to some exemplary embodiments, a second bit group may include a bit group including bits that are different from the first bit group among data to be encrypted. For example, if a size of data to be encrypted is 253 bits, and an encryption key is 128 bits, the first bit group may be 128 bits, and the second bit group may include different bits from the first bit group, and may be a group including the remaining, 125 bits.

According to some exemplary embodiments, the first device may preferentially encrypt bits among a plurality of bits, except those exceeding a size of an encryption key or except those remaining after dividing the bits by a multiple of a size of an encryption key. For example, if a size of an encryption unit block is 253 bits and an encryption key is 128 bits, the first device may encrypt 128 bits which are left after excluding 125 bits from 253 bits.

According to some exemplary embodiments, the first device may store an encrypted first bit group. The first device may store the encrypted first bit group in a storage unit such as a buffer, and may copy or delete at least one bit of the first bit group. Also, the first device may additionally store a second bit group which is not encrypted, apart from the first bit group.

In operation 605, the first device may select a third bit group which is at least one bit of the encrypted first bit group, based on size information of the encryption key and a size of the second bit group including bits that are different from the first bit group among the plurality of bits.

According to some exemplary embodiments, the third bit group may be at least one bit among a plurality of bits included in the first bit group. Also, the third bit group may be a group including at least one encrypted bit.

According to some exemplary embodiments, a size of the third bit group may be identical to a difference between a size of the encryption key and a size of the second bit group.

According to some exemplary embodiments, the first device may select some of the bits encrypted in operation 603 based on a difference between the number of bits that are not encrypted among data that is to be encrypted and includes a plurality of bits, and the size of the encryption key.

For example, if bits that are not encrypted in operation 603 are 125 bits, and a size of an encryption key is 128 bits, a difference between the size of the encryption key and a size of a non-encrypted bit group (the second bit group) is 3 bits, and thus the first device may select 3 bits among the bits encrypted in operation 603 or the first bit group.

According to some exemplary embodiments, the first device may store encryption group information, which is information about some selected bits among encrypted bits. Encryption group information may include at least one of information about the number of bits selected among encrypted bits and information indicating where the bits are located among the encrypted bits. For example, encryption group information may include information about a size of a third bit group and information indicating where bits included in the third bit group are located in the first bit group in FIG. 6. However, the encryption group information is not limited to the example, and may include any information needed in decryption.

According to some exemplary embodiments, the first device may delete the third bit group, which is selected from the first bit group, from the first bit group, and may merge the third bit group with the second bit group. According to some exemplary embodiments, the first device may delete the third bit group from a buffer in which the first bit group is stored and copy the third bit group to a buffer in which the second bit group is stored.

In operation 605, the first device may encrypt the second bit group and the selected third bit group by using the encryption key.

According to some exemplary embodiments, the first device may encrypt the third bit group selected in operation 605 and the second bit group at a time. According to some exemplary embodiments, the first device may encrypt a group in which the second bit group and the third bit group are merged.

For example, if a size of the second bit group that is not encrypted in operation 603 is 125 bits, and a size of the third bit group selected in operation 605 is 3 bits, a size of a group in which the second bit group and the third bit group are merged is 128 bits, and this corresponds to 128 bits which is the size of the encryption key, and thus, the first device may encrypt the second bit group and the selected third bit group by using an AES algorithm.

According to some exemplary embodiments, the first device may scramble data that is to be encrypted and includes a plurality of bits, and then perform encryption.

According to some exemplary embodiments, the first device may transmit at a time a first encryption group, which corresponds to the encrypted first bit group from which the third bit group is excluded, and a second encryption group, in which the second bit group and the third bit group are merged.

According to some exemplary embodiments, the first device may transmit at a time a group in which the first encryption group and the second encryption group are merged, for every predetermined period. That is, the first device may perform encryption by using an AES encryption algorithm and use a communication method using a predetermined protocol.

According to some exemplary embodiments, encryption of operations 601 through 607 may include AES encryption.

FIG. 7 is a detailed diagram illustrating a data encryption method according to exemplary embodiments.

FIG. 7 illustrates an encryption method as an example where a size of an encryption key 701 is 128 bits and a size of data 703 that is to be encrypted and includes 253 bits.

In a first encryption operation 771, a first device may encrypt a first bit group 705 which is 128 bits corresponding to a size of the encryption key 701 among the data 703. In the first encryption operation 771, the first device has not yet encrypted a second bit group 707 which is the remaining 125 bits.

In operation 773 of selecting at least one bit, the first device may select at least one bit of the first bit group 705. Referring to FIG. 7, the first device may select three bits which are at least one bit of the first bit group 705 based on a difference between the second bit group 707 and a size of the encryption key 701. A bit group selected by the first device in operation 773 is referred to as a third bit group 709.

In bit group merging operation 777, the first device may merge the second bit group 707 with the third bit group 709. That is, the first device may add the third bit group 709 to the second bit group 707. Referring to FIG. 7, a group of bits of the first bit group 705 from which the third bit group 709 is excluded is a first encryption group 711, and a group in which the second bit group 707 and the third bit group 709 are merged is a second encryption group 713.

In a second encryption operation 779, the first device may encrypt the second encryption group 713.

Referring to FIG. 7, a size of encryption data 715 including the first encryption group 711 and the second encryption group 713 is 253 bits, which is the same as the size of the data 703 before being encrypted. Also, the encryption data 715 does not include a non-encrypted portion. The first device may transmit the encryption data 715 to the second device.

In addition, according to some exemplary embodiments, the first device may transmit encryption group information which is information about the third bit group 709 to the second device. Encryption group information is described above with reference to FIG. 6, and thus detailed description will be omitted here.

FIGS. 8 through 12 are diagrams for explaining a method of encrypting data of various sizes, according to exemplary embodiments.

FIG. 8 illustrates an encryption method as an example where a size of an encryption key 801 is 128 bits and a size of data 803 to be encrypted is 253 bits.

According to some exemplary embodiments, a first device may encrypt a first bit group 805 that includes 128 bits among the data 803. Also, the first device may select a third bit group 809 which is at least one bit of the first bit group 805. A size of the third bit group 809 is 3 bits, which is identical to a difference between a size of a second bit group 807 and the size of the encryption key 801.

According to some exemplary embodiments, as described above with reference to FIG. 7, the first device may encrypt the second bit group 807 and the third bit group 809 at a time. As described above, the first device may use an AES encryption method.

According to some exemplary embodiments, the first device may transmit a first encryption group 811, which is a group of bits of the first bit group 805 from which the third bit group 809 is excluded, and a second encryption group 813, in which the second bit group 807 and the third bit group 809 are merged, to the second device.

FIG. 9 illustrates an encryption method as an example where a size of an encryption key 901 is 256 bits and a size of data 903 to be encrypted is 477 bits.

According to some exemplary embodiments, the first device may encrypt a first bit group 905 including 256 bits of the data 903. Also, the first device may select a third bit group 909, which is at least one bit of the first bit group 905. A size of the third bit group 909 is 35 bits, which is identical to a difference between a size of a second bit group 907 and the size of the encryption key 901.

According to some exemplary embodiments, the first device may encrypt the second bit group 907 and the third bit group 909 at a time.

According to some exemplary embodiments, the first device may transmit at a time a first encryption group 911, which is a group of bits of the first bit group 905 from which the third bit group 909 is excluded, and a second encryption group 913, in which the second bit group 907 and the third bit group 909 are merged, to the second device. A size of encryption data including the first encryption group 911 and the second encryption group 913 is 477 bits, which is identical to the size of the data 903 before being encrypted.

FIG. 10 illustrates an encryption method as an example where a size of an encryption key 1001 is 1024 bits and a size of data 1003 to be encrypted is 1200 bits.

According to some exemplary embodiments, a first device may encrypt a first bit group 1005 including 1024 bits of the data 1003. Also, the first device may select a third bit group 1009 which is at least one bit of the first bit group 1005. A size of the third bit group 1009 is 848 bits, which is identical to a difference between a size of a second bit group 1007 and the size of the encryption key 1001.

According to some exemplary embodiments, the first device may encrypt the second bit group 1007 and the third bit group 1009 at a time.

According to some exemplary embodiments, the first device may transmit at a time a first encryption group 1011, which is a group of bits of the first bit group 1005 from which the third bit group 1009 is excluded, and a second encryption group 1013, in which the second bit group 1007 and the third bit group 1009 are merged, to the second device. A size of encryption data including the first encryption group 1011 and the second encryption group 1013 is 1200 bits, which is identical to the size of the data 1003 before being encrypted.

FIG. 11 illustrates an encryption method as an example where a size of an encryption key 1101 is 2048 bits and a size of data 1103 to be encrypted is 2500 bits.

According to some exemplary embodiments, a first device may encrypt a first bit group 1105 including 2048 bits of the data 1103. Also, the first device may select a third bit group 1109 which is at least one bit of the first bit group 1105. A size of the third bit group 1109 is 1596 bits, which is identical to a difference between a size of a second bit group 1107 and the size of the encryption key 1101.

According to some exemplary embodiments, the first device may encrypt the second bit group 1107 and the third bit group 1109 at a time. As described above, the first device may use an AES encryption method.

According to some exemplary embodiments, the first device may transmit at a time a first encryption group 1111, which is a group of bits of the first bit group 1105 from which the third bit group 1109 is excluded, and a second encryption group 1113, in which the second bit group 1107 and the third bit group 1109 are merged, to the second device. A size of encryption data including the first encryption group 1111 and the second encryption group 1113 is 2500 bits, which is identical to the size of the data 1103 before being encrypted.

FIG. 12 illustrates an encryption method as an example where a size of an encryption key 1201 is 128 bits and a size of data 1203 to be encrypted is 73 bits.

If a size of an encryption key is greater than a size of data to be encrypted, the first device may change the size of the encryption key. For example, the first device may divide an encryption key by a power of 2. Also, according to some exemplary embodiments, when changing a size of an encryption key, the first device may use only a portion of an encryption key.

FIG. 12 illustrates an encryption method in which a first device reduces a size of an encryption key by half to perform encryption by using the changed encryption key. A size of a changed encryption key 1222 may be 64 bits.

According to some exemplary embodiments, the first device may encrypt a first bit group 1205 including 64 bits of the data 1203. Also, the first device may select a third bit group 1209 which is at least one bit of the first bit group 1205. A size of the third bit group 1209 is 55 bits, which is identical to a difference between a size of a second bit group 1207 and the size of the encryption key 1222.

According to some exemplary embodiments, the first device may encrypt the second bit group 1207 and the third bit group 1209 at a time.

According to some exemplary embodiments, the first device may transmit at a time a first encryption group 1211, which is a group of bits of the first bit group 1205 from which the third bit group 1209 is excluded, and a second encryption group 1213, in which the second bit group 1207 and the third bit group 1209 are merged, to the second device. A size of encryption data including the first encryption group 1211 and the second encryption group 1213 is 73 bits, which is identical to the size of the data 1203 before encryption.

FIG. 13 is a flowchart of a method of scrambling and encrypting data, according to exemplary embodiments.

In operation 1301, the first device may scramble data that is to be encrypted and includes a plurality of bits.

According to some exemplary embodiments, data scrambling may include a method of encoding data so that the data is appropriate for transmission. According to some exemplary embodiments, as encrypted data is going to be transmitted to the second device, the first device may perform scrambling before encryption to thereby encode data so that the data is appropriate for transmission. According to exemplary embodiments, scrambling may also be performed after encryption.

According to some exemplary embodiments, the first device may perform before or after encryption not only scrambling, but also other additional data processing such as interleaving or multiplexing as described above, and the exemplary embodiments are not limited thereto.

Operations 1303 through 1309 respectively correspond to description provided with reference to FIG. 6, and thus detailed description will be omitted.

FIG. 14 is a diagram for explaining method of scrambling and encrypting data, according to exemplary embodiments.

Referring to FIG. 14, the first device may scramble data 1401. The first device may encrypt scrambled data 1403 by using an encryption key. The first device may encrypt the scrambled data 1403.

According to some exemplary embodiments, the first device may encrypt the scrambled data 1403 and transmit encrypted data 1407 to the second device. Also, according to some exemplary embodiments, the first device may scramble encrypted data after encryption is performed. This corresponds to description with reference to FIG. 13, and thus detailed description will be omitted.

FIG. 15 is a flowchart of a data decryption method according to exemplary embodiments.

In operation 1501, the second device may receive from the first device encrypted data including a first encryption group and a second encryption group and encryption group information.

According to some exemplary embodiments, the second device may receive encrypted data and encryption group information from the first device together or separately.

According to some exemplary embodiments, encryption group information may include information about at least one bit in the second encryption group for decrypting the first encryption group. According to some exemplary embodiments, encryption group information may be the same as encryption group information described with reference to FIG. 6.

According to some exemplary embodiments, at least one bit in the second encryption group may be the same as the third bit group described with reference to FIG. 6. As described above with reference to FIG. 6, the second encryption group is a group in which the second bit group and the third bit group are merged, and the third bit group is a portion of the first bit group. Thus, in order for the second device to accurately encrypt the first bit group or the first encryption group, the first encryption group and the third bit group are to be encrypted together, and thus, the second device may receive from the first device encryption group information which is information about the third bit group selected by the first device.

In operation 1503, the second device may encrypt the received second encryption group by using a decryption key.

According to some exemplary embodiments, if the second device stores at least one decryption key, the second device may select a decryption key corresponding to the received second encryption group, and may decrypt the second encryption group by using the selected decryption key.

For example, if the second device stores a decryption key having a size of 128 bits, a decryption key having a size of 256 bits, and a decryption key having a size of 1024 bits, the second device may select a decryption key having a size corresponding to a size of the decryption group, and may decrypt the second encryption group by using the selected decryption key.

According to some exemplary embodiments, the second device may store the decrypted second encryption group.

In operation 1505, the second device may select at least one bit of the second encryption group based on the received encryption group information.

According to some exemplary embodiments, at least one bit of the second encryption group selected by the second device based on the encryption group information may be the third bit group described with reference to FIGS. 6 through 13. In other words, at least one bit selected by the second device based on the encryption group information may include at least one bit that is re-encrypted with the second bit group after the first bit group is encrypted.

According to some exemplary embodiments, the second device may store the second encryption group, and may select at least one bit of the second encryption group that is stored based on the received encryption group information.

In operation 1507, the second device may merge the selected at least one bit of the second encryption group with the received first encryption group.

According to some exemplary embodiments, the second device may delete bits selected from the stored second encryption group, from the second encryption group, and may merge the bits with the first encryption group. That is, the second device may add bits selected in operation 1505 to the first encryption group.

In operation 1509, the second device may decrypt a group obtained by merging in operation 1507.

According to some exemplary embodiments, the group obtained by merging by the second device in operation 1507 corresponds to a decryption key of the second device, and thus, decryption by using an AES decryption algorithm may be performed.

According to some exemplary embodiments, decryption according to operations 1501 through 1509 may be performed according to an AES decryption algorithm.

FIG. 16 is a detailed diagram for explaining a data decryption method according to exemplary embodiments.

As described with reference to FIG. 15, the second device may receive encrypted data 1601 from the first device. Referring to FIG. 16, a size of the encrypted data 1601 may be 253 bits, and may be data that is encrypted by using an AES encryption algorithm.

In addition, according to some exemplary embodiments, the second device may receive encryption group information from the first device. Encryption group information corresponds to description provided above, and thus detailed description will be omitted.

According to some exemplary embodiments, the second device may select a decryption key 1603. Referring to FIG. 16, a size of the decryption key 1603 selected by the second device may be 128 bits.

According to some exemplary embodiments, the encrypted data 1601 may include a first encryption group 1605 and a second encryption group 1607. A size of the first encryption group 1605 in FIG. 16 is 125 bits, and the first encryption group 1605 of FIG. 16 may correspond to the first encryption group 711 of FIG. 7. That is, the first encryption group 1605 of FIG. 16 may include an encrypted bit group corresponding to the first bit group described with reference to FIGS. 6 through 8, from which the third bit group is excluded.

The second encryption group 1607 may correspond to the second encryption group 713 of FIG. 7. The second encryption group 1607 of FIG. 16 may include the encrypted bit group described with reference to FIGS. 6 and 7, in which the second bit group and the third bit group are merged.

According to some exemplary embodiments, a size of the second encryption group is the same as a decryption key of the second device, and thus, the second device may AES-decrypt the second encryption group. Decryption of the second encryption group may be referred to as a first decryption operation.

According to some exemplary embodiments, the second device may select at least one bit of the second encryption group 1607 that is decrypted. According to some exemplary embodiments, the second device may select at least one bit of the second encryption group 1607 based on encryption group information received from the first device. Referring to FIG. 16, a size of selected bits 1609 is 3 bits.

The second device may merge the selected bits 1609 with the first encryption group 1605. A size of the merged bit group is 128 bits and is the same as the size of the decryption key 1603, and thus, the second device may decrypt the merged bit group by using the decryption key 1603. Decryption of the merged bit group may be referred to as a second decryption operation.

According to some exemplary embodiments, through the first decryption operation and the second decryption operation, the second device may AES-decrypt AES-encrypted data. The decrypted data 1611 may also be 253 bits, which is the same as the size of the encrypted data 1601.

FIG. 17 is a flowchart of a method of descrambling and decrypting data, according to exemplary embodiments.

In operation 1701, the second device may receive from the first device scrambled data including a first encryption group and a second encryption group.

According to some exemplary embodiments, scrambled data may include data that is scrambled before or after encryption.

In operation 1703, the second device may descramble data received in operation 1701. Descrambling may refer to an operation of restoring scrambled data to a state before it is scrambled, and is not limited to the above example.

According to some exemplary embodiments, as described above, the second device may perform an additional necessary process for using the received data, such as decoding or demultiplexing, before or after decryption.

Operations 1705 through 1707 correspond to description provided with reference to FIG. 15, and thus detailed description will be omitted.

FIGS. 18 and 19 are block diagrams for explaining a first device 101 performing encryption, according to exemplary embodiments.

Not all of elements illustrated in FIGS. 18 and 19 are necessary elements of the first device 101. The first device 101 may be formed of more or less elements than those illustrated in FIGS. 18 and 19. According to some exemplary embodiments, the first device 101 may be a device that performs encryption.

Referring to FIG. 18, the first device 101 may include a data information obtaining unit 1801, an encryption unit 1803, and a controller 1805.

According to some exemplary embodiments, the data information obtaining unit 1801 may obtain size information of an encryption key and size information of data that is to be encrypted and includes a plurality of bits.

According to some exemplary embodiments, if the first device 101 stores a plurality of encryption keys, the data information obtaining unit 1801 may obtain size information of each of the plurality of encryption keys.

According to some exemplary embodiments, the encryption unit 1803 may encrypt, by using an encryption key, a first bit group, which is at least one bit corresponding to a size of an encryption key, among the plurality of bits included in the data to be encrypted. Also, the encryption unit 1803 may select a third bit group which is at least one bit of the encrypted first bit group based on size information of the encryption key and a size of a second bit group including bits that are different from the first bit group among the plurality of bits included in the data to be encrypted. Also, the encryption unit 1803 may encrypt the second bit group and the selected bit group by using the encryption key.

According to some exemplary embodiments, the encryption unit 1803 may delete the third bit group selected from the bit group, and add the third bit group to the second bit group, and encrypt the second bit group, to which the third bit group is added.

According to some exemplary embodiments, a size of the third bit group may be the same as a difference between the size of the encryption key and the size of the second bit group.

According to some exemplary embodiments, the encryption unit 1803 may determine whether a size of data to be encrypted is a multiple of the size of the encryption key.

According to some exemplary embodiments, the encryption unit 1803 may be included in the controller 1805. That is, without separating the encryption unit 1803 and the controller 1805, the controller 1805 may perform an operation of the encryption unit 1803.

According to some exemplary embodiments, the controller 1805 may control all elements included in the first device 101, and may include an operation unit such as a central processing unit (CPU), and the controller 1805 may be included in another element. However, the exemplary embodiments are not limited thereto.

Referring to FIG. 19, the encryption unit 1803 may further include an encryption key determining unit 1811, and if a size of an encryption key is greater than a size of data to be encrypted, the encryption key determining unit 1811 may change the encryption key to a predetermined size.

Referring to FIG. 19, the first device 101 may further include a communication unit 1807 and a storage unit 1809.

According to some exemplary embodiments, the communication unit 1807 may transmit at a time a first encryption group corresponding to the encrypted first bit group, from which the third bit group is excluded, and a second encryption group, in which the second bit group and the third bit group are merged.

According to some exemplary embodiments, the communication unit 1807 may transmit encryption group information including information about the selected third bit group.

According to some exemplary embodiments, the communication unit 1807 may transmit a group, in which the first encryption group and the second encryption group are merged, at a time for every predetermined period. For example, the communication unit 1807 may transmit encrypted data, in which the first encryption group and the second encryption group are merged, for every predetermined period, based on a communication method for connection to the second device, or a protocol used in communication with the second device.

According to some exemplary embodiments, the encryption unit 1803 may encrypt various sizes of data by using an AES encryption algorithm without changing a size of encrypted data. Thus, the communication unit 1807 may also comply with a communication method according to a predetermined protocol.

In addition, the first device 101 may further include a scrambling unit (not shown), and the scrambling unit may scramble data that is to be encrypted and includes a plurality of bits.

According to some exemplary embodiments, the storage unit 1809 may store the first bit group and the second bit group, respectively. According to some exemplary embodiments, the encryption unit 1803 may select the third bit group which is at least one bit of the first bit group stored in the storage unit 1809, delete the selected third bit group from the first bit group, and merge the selected third bit group with the second bit group, and store the merged bit groups.

FIGS. 20 and 21 are block diagrams for explaining a second device 103 that performs decryption, according to exemplary embodiments.

Not all of elements illustrated in FIGS. 20 and 21 are necessary elements of the second device 103. The second device 103 may be formed of more or less elements than those illustrated in FIGS. 20 and 21. According to some exemplary embodiments, the second device 103 may be a device that performs decryption.

Referring to FIG. 20, the second device 103 may include a decryption unit 2001, a communication unit 2003, and a controller 2005.

According to some exemplary embodiments, the decryption unit 2001 may decrypt a received second encryption group by using a decryption key. Also, the decryption unit 2001 may select at least one bit of the second encryption group based on received encryption group information. Also, the decryption unit 2001 may merge the selected some of bits of the second encryption group and the received first encryption group, and may decrypt the merged encryption groups.

According to some exemplary embodiments, encryption group information may include information about at least one bit of the second encryption group needed to decrypt the first encryption group.

According to some exemplary embodiments, the decryption unit 2001 may be included in the controller 2005. That is, without separating the decryption unit 2001 and the controller 205, the controller 2005 may perform an operation of the decryption unit 2001.

According to some exemplary embodiments, the communication unit 2003 may receive encrypted data including the first encryption group and the second encryption group and encryption group information.

According to some exemplary embodiments, the controller 2005 may control all elements included in the second device 103, and may include an operation unit such as a CPU, and the controller 2005 may also be included in another element. However, the exemplary embodiments are not limited thereto.

Referring to FIG. 20, the decryption unit 2001 may further include a decryption key determining unit 2009. The decryption key determining unit 2009 may select a decryption key corresponding to the received second encryption group. According to some exemplary embodiments, the decryption key determining unit 2009 may select a decryption key corresponding to a size of the received second encryption group.

Referring to FIG. 21, the second device 103 may further include a storage unit 2007.

According to some exemplary embodiments, the storage unit 2007 may store the first encryption group and the second encryption group, respectively. Also, the storage unit 2007 may store the decrypted second encryption group.

According to some exemplary embodiments, the decryption unit 2001 may select at least one bit of the second encryption group stored in the storage unit 2007 based on encryption group information. The decryption unit 2001 may delete the selected at least one bit from the stored second encryption group, and may merge the selected bits with the first encryption group.

According to some exemplary embodiments, the decryption unit 2001 may decrypt a group, in which the first encryption group and the selected at least one bit of the second encryption group are merged.

FIG. 22 is a detailed block diagram for explaining an encryption device according to exemplary embodiments.

In detail, FIG. 22 is a block diagram for explaining a structure of a device 200 according to exemplary embodiments.

As illustrated in FIG. 22, the first device 101 according to some exemplary embodiments may further include a user input unit 2200, an output unit 2210, a sensing unit 2220, and an audio/video (A/V) input unit 2240, in addition to a communication unit 1807, a storage unit 1809, a data information obtaining unit 1801, an encryption unit 1803, and a controller 1805.

The communication unit 1807 may include at least one element that allows communication between the first device 101 and the second device 103. For example, the communication unit 1807 may include a short-range wireless communication unit 2231, a mobile communication unit 2232, and a broadcasting receiving unit 2233.

The short-range wireless communication unit 2231 may include a Bluetooth communication unit, a Bluetooth Low Energy (BLE) communication unit, a near field communication unit, a WLAN (WiFi) communication unit, a ZigBee communication unit, an infrared data association (IrDA) communication unit, a Wi-Fi Direct (WFD) communication unit, a Ultra Wideband (UWB) communication unit, an Ant+ communication unit or the like, but is not limited thereto.

The mobile communication unit 2232 may transmit or receive a wireless signal to or from at least one of a base station, an external terminal, and a server on a mobile communication network. Examples of a wireless signal may include a voice call signal, a video call signal, or various types of data according to transmission and reception of text or multimedia messages.

The broadcasting receiving unit 233 may receive a broadcasting signal received from the outside through a broadcasting channel and/or broadcasting-related information. A broadcasting channel may include a satellite channel and a terrestrial channel. According to exemplary embodiments, the device 200 may not include the broadcasting receiving unit 2233.

Also, the communication unit 1807 may transmit or receive encrypted data and may also transmit encryption group information. This is described above and thus detailed description will be omitted.

The storage unit 1809 may store a program for processing and controlling of the controller 1805, and may store data that is input to or output from the first device 101.

The storage unit 1809 may include at least one type of storage medium selected from a flash memory type, a hard disk type, a multimedia card micro type, a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Programs stored in the storage unit 1809 may be classified into a plurality of modules according to respective functions, for example, into a user interface (UI) module 2251, a touch screen module 2252, and a notification module 2253.

The UI module 2251 may provide a specialized UI or graphical user interface (GUI) that is linked with the first device 101 according to applications. The touch screen module 2252 may sense a touch gesture on a touch screen of a user, and may transmit information about the touch gesture to the controller 1805. The touch screen module 2252 may recognize and analyze a touch code. The touch screen module 2252 may be formed of an additional hardware including a controller.

In order to sense a touch or a proximity touch on a touch screen, various sensors may be included inside or near the touch screen. An example of a sensor for sensing a touch on a touch screen is a tactile sensor, which refers to a sensor that senses contact of a predetermined object to a degree or more than that a person senses. A tactile sensor may sense various pieces of information such as the roughness on a contact surface, the rigidity of a contacting object, the temperature at a contact point, or the like.

Also, an example of a sensor for sensing a touch on a touch screen is a proximity sensor.

A proximity sensor refers to a sensor that detects whether there is an object approaching a predetermined detection surface or an object present near the detection surface by using a force of an electrical field or an infrared ray without a mechanical contact. Examples of a proximity sensor are a transmissive photoelectric sensor, a direct reflection type photoelectric sensor, a minor reflection type photoelectric sensor, a high-frequency oscillation proximity sensor, a capacitive proximity sensor, a magnetic proximity sensor, and an infrared proximity sensor. Examples of a touch gesture of a user are a tap, a touch&hold, a double tap, a drag, panning, a flick, a drag and drop, and a swipe.

The notification module 2253 may generate a signal that notifies generation of an event. Examples of an event generated by the first device 101 are reception of a call signal, reception of a message, input of a key signal, and notification of a schedule. The notification module 2253 may output a notification signal in the form of a video signal via the display 2211 or in the form of an audio signal via the audio output unit 2212, or in the form of a vibration signal via the vibration motor 2213, but is not limited thereto. An operation performed by the storage unit 2250 is the same as described above, and thus detailed description thereof will be omitted.

The controller 1805 typically controls an overall operation of the first device 101. For example, the controller 1805 may execute a program stored in the first device 101 to control an overall operation of elements included in the first device 101. This corresponds to description provided above, and thus detailed description thereof will be omitted.

The user input unit 2200 refers to a unit for inputting data used by the user to control the first device 101. The user input unit 2200 may be a key pad, a dome switch, a touch pad (e.g., capacitive overlay, resistive overlay, infrared beam, surface acoustic wave, integral strain gauge, and piezoelectric type touch pads), a jog wheel, and a jog switch, but is not limited thereto.

The output unit 2210 may output an audio signal, a video signal or a vibration signal and may include a display unit 2211, an audio output unit 2212, and a vibration motor 2213.

The display unit 2211 displays and outputs information processed by the first device 101.

When the display unit 2211 and a touch pad are configured in a layered structure as a touch screen, the display 2211 may be used as both an input device and an output device. The display unit 2211 may include at least one of a liquid crystal display, a thin film transistor-liquid crystal display, an organic light-emitting diode, a flexible display, a 3D display, and an electrophoretic display (EPD). According to its implementation form, the first device 101 may include at least two display units 2211. The at least two displays 2211 may be disposed to face each other by using a hinge.

The audio output unit 2212 outputs audio data that is received from the communication unit 1807 or stored in the storage unit 2250. Also, the audio output unit 2212 outputs an audio signal related to a function performed by the first device 101 (e.g., a call signal reception sound, a message reception sound or a notification sound). The audio output unit 2212 may include a speaker or a buzzer or the like.

The vibration motor 2213 may output a vibration signal. For example, the vibration motor 2213 may output a vibration signal corresponding to output of audio data or video data (e.g., a call signal reception sound, a message reception sound or the like). Also, the vibration motor 2213 may also output a vibration signal if a touch is input to the touch screen.

The sensing unit 2220 may sense a state of the first device 101 or a state of an environment of the first device 101 and transmit sensed information to the controller 1805.

The sensing unit 2220 may include at least one of a geomagnetic sensor 2221, an acceleration sensor 2222, a temperature/humidity sensor 2223, an infrared sensor 2224, a gyro sensor 2225, a position sensor (e.g., GPS) 2226, an atmospheric pressure sensor 2227, a proximity sensor 2228, and an illuminance sensor 2229, but is not limited thereto. Functions of the respective sensors may be intuitively inferred from the names thereof by one of ordinary skill in the art and thus detailed description will be omitted.

The A/V input unit 2240 is used to input an audio signal or a video signal, and may include a camera 2241 and a microphone 2242 or the like. The camera 2241 may obtain an image frame such as a still image or a video by using an image sensor in a video call mode or a photographing mode. An image captured by using the image sensor may be processed using the controller 1805 or an additional image processor (not shown).

An image frame processed by using the camera 2241 may be stored in the storage unit 2250 or transmitted to the outside via the communication unit 1807. Two or more cameras 2241 may be included according to a configuration aspect of a terminal.

The microphone 2242 receives an external audio signal and processes the same to an electrical audio data. For example, the microphone 2242 may receive an audio signal from the first device 101 or a speaker. The microphone 2242 may use various noise elimination algorithms for eliminating noise generated during reception of an external audio signal.

The data information obtaining unit 1801 may obtain information about data to be encrypted and size information of an encryption key, which is as described above and detailed description of which will be thus omitted.

The encryption unit 1803 may encrypt data using various methods. According to some exemplary embodiments, the encryption unit 1803 may AES-encrypt data of various sizes. Also, the encryption unit 1803 may include an encryption key determining unit 1811. These elements are as described above, and thus detailed description will be omitted. According to exemplary embodiments, the encryption unit 1803 may be included in the controller 1805.

According to some exemplary embodiments, the second device 103 may include the same elements as the first device 101 except the data information obtaining unit 1801 and the encryption unit 1803, and may further include the decryption unit 2001. The decryption unit 2001 is described above, and thus detailed description will be omitted.

The device described herein may comprise a processor, a memory for storing program data and executing it, a permanent storage device such as a disk drive, a communications port for handling communications with external devices, and user interface devices, including a display, a keyboard, etc. When software modules are involved, these software modules may be stored as program instructions or computer-readable codes executable on the processor on a computer-readable media such as magnetic storage media (e.g., read-only memory (ROM), random-access memory (RAM), floppy disks, hard disks, etc.) and optical recording media (e.g., CD-ROMs, DVDs, etc.). The computer-readable recording medium can also be distributed over network coupled computer systems so that the computer-readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the inventive concept, reference has been made to the preferred exemplary embodiments illustrated in the drawings, and specific language has been used to describe these exemplary embodiments. However, no limitation of the scope of the inventive concept is intended by this specific language, and the inventive concept should be construed to encompass all exemplary embodiments that would normally occur to one of ordinary skill in the art.

The inventive concept may be described in terms of functional block components and various processing steps. Such functional blocks may be realized by any number of hardware and/or software components configured to perform the specified functions. For example, the inventive concept may employ various integrated circuit components, e.g., memory elements, processing elements, logic elements, look-up tables, and the like, which may carry out a variety of functions under the control of one or more microprocessors or other control devices. Similarly, where the elements of the inventive concept are implemented using software programming or software elements the inventive concept may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the inventive concept could employ any number of conventional techniques for electronics configuration, signal processing and/or control, data processing and the like. The words "mechanism" and "element" are used broadly and are not limited to mechanical or physical exemplary embodiments, but can include software routines in conjunction with processors, etc.

The particular implementations shown and described herein are illustrative examples of the inventive concept and are not intended to otherwise limit the scope of the inventive concept in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical".

The use of the terms "a" and "an" and "the" and similar referents in the context of describing the inventive concept (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the inventive concept and does not pose a limitation on the scope of the inventive concept unless otherwise claimed. Numerous modifications and adaptations will be readily apparent to those skilled in this art without departing from the spirit and scope of the inventive concept.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The invention claimed is:

1. A method of encrypting data transmitted from a first device to a second device, performed by using an Advanced Encryption Standard (AES) encryption algorithm, the method comprising:
   obtaining size information of an encryption key and size information of data that is to be encrypted and includes a plurality of bits;
   encrypting a first bit group among the plurality of bits, by using the encryption key, the first bit group including at least one bit and corresponding to a size of the encryption key;
   selecting a third bit group, which includes at least one bit of the encrypted first bit group and is based on the size of the encryption key and a size of a second bit group, among the plurality of bits, which includes bits that are different from the at least one bit in the first bit group; and
   encrypting the second bit group and the selected third bit group, by using the encryption key, wherein
   the encryption key is changed to a predetermined size, smaller than a size of the data to be encrypted, if the size of the encryption key is greater than the size of the data to be encrypted.

2. The method of claim 1, further comprising transmitting at a time a first encryption group corresponding to the encrypted first bit group, from which the third bit group is excluded, and a second encryption group, in which the second bit group and the third bit group are merged, to the second device.

3. The method of claim 2, wherein the transmitting comprises transmitting a group in which the first encryption group and the second encryption group are merged, for every predetermined period.

4. The method of claim 1, further comprising transmitting encryption group information including information about the selected third bit group, to the second device.

5. The method of claim 1, further comprising determining whether a size of the data to be encrypted is a multiple of the size of the encryption key.

6. The method of claim 1, wherein a size of the third bit group is identical to a difference between the size of the encryption key and the size of the second bit group.

7. A device for encrypting data by using an Advanced Encryption Standard (AES) encryption algorithm, the device comprising processing circuitry configured to:
   obtain size information of an encryption key and size information of data that is to be encrypted and includes a plurality of bits; and
   encrypt a first bit group among the plurality of bits, by using the encryption key which is at least one bit corresponding to a size of the encryption key, among the plurality of bits, by using the encryption key, selecting a third bit group, which is at least one bit of the encrypted first bit group, based on size information of the encryption key and a size of a second bit group including bits that are different from the first bit group, among the plurality of bits, and encrypting the second bit group and the selected third bit group by using the encryption key, wherein the encryption key is changed to a predetermined size, smaller than a size of the data to be encrypted, if the size of the encryption key is greater than the size of the data to be encrypted.

8. The device of claim 7, further comprising communication circuitry configured to transmit at a time a first encryption group corresponding to the encrypted first bit group, from which the third bit group is excluded, and a second encryption group in which the second bit group and the third bit group are merged.

9. The device of claim 8, wherein the communication circuitry is configured to transmit at a time a group in which the first encryption group and the second encryption group are merged, for every predetermined period.

10. The device of claim 7, further comprising communication circuitry configured to transmit encryption group information including information about the selected third bit group.

11. The device of claim 7, wherein the processing circuitry is configured to determine whether a size of the data to be encrypted is a multiple of the size of the encryption key.

12. The device of claim 7, wherein a size of the third bit group is identical to a difference between the size of the encryption key and the size of the second bit group.

13. A non-transitory computer-readable recording medium having embodied thereon a program which, when executed by a processor of a device for encrypting data by using an Advanced Encryption Standard (AES) encryption algorithm, controls the device to perform operations comprising:

obtaining size information of an encryption key and size information of data that is to be encrypted and includes a plurality of bits;

encrypting a first bit group, which is at least one bit corresponding to a size of the encryption key, among the plurality of bits, by using the encryption key;

selecting a third bit group, which is at least one bit of the encrypted first bit group based on size information of the encryption key and a size of a second bit group including bits that are different from the first bit group among the plurality of bits; and encrypting the second bit group and the selected third bit group by using the encryption key, wherein the encryption key is changed to a predetermined size, smaller than a size of the data to be encrypted, if the size of the encryption key is greater than the size of the data to be encrypted.

* * * * *